United States Patent
Maheshwari et al.

(10) Patent No.: US 11,086,316 B2
(45) Date of Patent: Aug. 10, 2021

(54) ROBOTIC VEHICLE INSECURE PAY LOAD DETECTION AND RESPONSE

(71) Applicant: QUALCOMM Incorporated, San Diego, CA (US)

(72) Inventors: Ankit Maheshwari, Hyderabad (IN); Michael Franco Taveira, Rancho Santa Fe, CA (US); Ankur Maheshwari, Hyderabad (IN); Shruti Agrawal, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 82 days.

(21) Appl. No.: 16/115,929

(22) Filed: Aug. 29, 2018

(65) Prior Publication Data
US 2019/0072953 A1 Mar. 7, 2019

(30) Foreign Application Priority Data
Sep. 7, 2017 (IN) .............................. 201741031721

(51) Int. Cl.
*G05D 1/00* (2006.01)
*G05D 1/04* (2006.01)
*B64C 39/02* (2006.01)
*B64D 9/00* (2006.01)

(52) U.S. Cl.
CPC ......... *G05D 1/0055* (2013.01); *B64C 39/024* (2013.01); *B64D 9/003* (2013.01); *G05D 1/042* (2013.01); *B64C 2201/024* (2013.01); *B64C 2201/027* (2013.01); *B64C 2201/108* (2013.01); *B64C 2201/128* (2013.01); *B64C 2201/141* (2013.01)

(58) Field of Classification Search
CPC .... G05D 1/0055; G05D 1/042; B64C 39/024; B64C 2201/024; B64C 2201/027; B64C 2201/108; B64C 2201/128; B64C 2201/141; B64D 9/003
See application file for complete search history.

(56) References Cited

U.S. PATENT DOCUMENTS

| | | | |
|---|---|---|---|
| 4,593,264 A * | 6/1986 | Engle | H01H 13/18 |
| | | | 280/507 |
| 4,630,205 A | 12/1986 | Otaka | |
| 5,969,433 A | 10/1999 | Maggiora et al. | |
| 9,471,059 B1 | 10/2016 | Wilkins et al. | |
| 9,501,061 B2 | 11/2016 | Canoy et al. | |

(Continued)

FOREIGN PATENT DOCUMENTS

| | | |
|---|---|---|
| DE | 102008030546 A1 | 12/2009 |
| JP | H09124298 A | 5/1997 |

(Continued)

OTHER PUBLICATIONS

International Search Report and Written Opinion—PCT/US2018/048712—ISA/EPO—dated Nov. 14, 2018, 14 pages.

*Primary Examiner* — Navid Ziaeianmehdizadeh
(74) *Attorney, Agent, or Firm* — Holland & Hart LLP

(57) ABSTRACT

Various embodiments include methods, devices, and systems of transporting a payload using a robotic vehicle. Various embodiments may include determining whether a payload is securely held by the robotic vehicle, and taking a corrective action in response to determining that the payload is not securely held by the robotic vehicle.

30 Claims, 13 Drawing Sheets

(56) References Cited

U.S. PATENT DOCUMENTS

| | | |
|---|---|---|
| 9,550,561 B1 | 1/2017 | Beckman et al. |
| 9,580,173 B1 | 2/2017 | Burgess et al. |
| 9,850,001 B1 | 12/2017 | Gill et al. |
| 10,040,552 B2 | 8/2018 | Gordon et al. |
| 10,137,984 B1 * | 11/2018 | Flick ..................... B64D 47/00 |
| 2015/0336671 A1 | 11/2015 | Winn et al. |
| 2016/0159471 A1 | 6/2016 | Chan et al. |
| 2016/0159472 A1 | 6/2016 | Chan et al. |
| 2016/0253907 A1 * | 9/2016 | Taveira ................ G08G 5/0069 701/3 |
| 2016/0264234 A1 | 9/2016 | Vaughn et al. |
| 2016/0307154 A1 | 10/2016 | Moore et al. |
| 2017/0001724 A1 | 1/2017 | Yates |
| 2017/0021915 A1 | 1/2017 | Vaughn et al. |
| 2017/0110017 A1 | 4/2017 | Kimchi et al. |
| 2017/0174343 A1 | 6/2017 | Erickson et al. |
| 2017/0355461 A1 | 12/2017 | Naito et al. |
| 2017/0357263 A1 | 12/2017 | Glatfelter et al. |
| 2018/0322443 A1 * | 11/2018 | Barrington ........... G06Q 10/083 |
| 2019/0072954 A1 | 3/2019 | Taveira et al. |

FOREIGN PATENT DOCUMENTS

| | | |
|---|---|---|
| JP | 2018022309 A | 2/2018 |
| WO | 2016144421 A1 | 9/2016 |

* cited by examiner

ROBOTIC VEHICLE INSECURE PAY LOAD DETECTION AND RESPONSE

RELATED APPLICATIONS

This application claims the benefit of priority to Indian Provisional Patent Application No. 201741031721, entitled "Robotic Vehicle Insecure Payload Detection and Response" filed Sep. 7, 2017, assigned to the assignee hereof, the entire contents of which are hereby incorporated by reference.

BACKGROUND

Robotic vehicles, such as aerial robotic vehicles, are often used to deliver an item or items (packages, payloads, and/or other cargo). However, occasionally cargo of the robotic vehicle, including the item(s) being delivered or equipment onboard the robotic vehicle, may not be completely attached or come unfastened from the robotic vehicle. As a result, the cargo may shift, further loosen, and/or even separate from the robotic vehicle enroute to a destination. In such cases, the shifting/loosened/separation of cargo may compromise the safety of the cargo, people, property, and/or the robotic vehicle.

SUMMARY

Various embodiments include devices, systems, and methods for transporting a payload using a robotic vehicle. Various embodiments may include determining whether a payload is securely held by the robotic vehicle, and taking a corrective action in response to determining that the payload is not securely held by the robotic vehicle.

In some embodiments, determining whether the payload is securely held by the robotic vehicle may be based on an indication received from a sensor configured to detect changes in where the payload is held by the robotic vehicle. In some embodiments, determining whether the payload is securely held by the robotic vehicle may be based on an indication received from an onboard motor of the robotic vehicle in the form of a change in motor load. In some embodiments, determining whether the payload is securely held by the robotic vehicle may be based on an indication received from an onboard motor of the robotic vehicle in the form of a change in lift profile of the robotic vehicle.

In some embodiments, taking the corrective action may include a processor changing a force applied to the payload by at least one of a payload securing mechanism. In some embodiments, taking the corrective action may include adjusting a navigation plan, which may include changing a route to a destination. In some embodiments, the navigation plan may control at least one navigation characteristic selected from a group including slowing-down, reducing maneuverability, reducing top speed, limiting acceleration, reducing altitude, avoiding dangerous recovery zones, avoiding impractical recovery zones, avoiding a route through or over an occupied area, and avoiding one or more properties. In some embodiments, taking the corrective action may include activating at least one sensor not currently monitoring payload. In some embodiments, taking the corrective action may include transmitting a message indicating the payload is loose. Taking the corrective action may include transmitting via an onboard transmitter a request for assistance. In some embodiments, taking the corrective action may include determining a parking location for the robotic vehicle and controlling the robotic vehicle to park at the determined parking location. In some embodiments, the robotic vehicle may be an aerial robotic vehicle.

Further embodiments include a robotic vehicle having a processor configured to perform operations of any of the methods summarized above. Further embodiments may include a robotic vehicle having means for performing functions of any of the methods summarized above. Further embodiments may include a non-transitory processor-readable storage medium having stored thereon processor-executable instructions configured to cause a processor of a robotic vehicle to perform operations of any of the methods summarized above. Further embodiments may include a processing device for use in a robotic vehicle and configured with processor-executable instructions to perform operations of any of the methods summarized above.

BRIEF DESCRIPTION OF THE DRAWINGS

The accompanying drawings, which are incorporated herein and constitute part of this specification, illustrate example embodiments, and together with the general description given above and the detailed description given below, serve to explain the features of the claims.

DETAILED DESCRIPTION

Figure 1A:
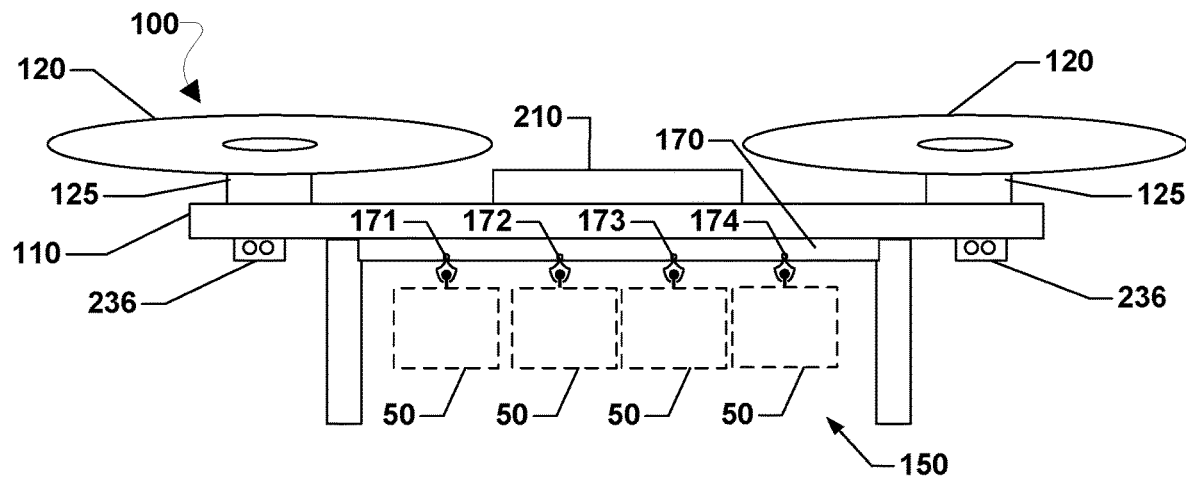
FIG. 1A is a schematic side elevation diagram of a robotic vehicle carrying several payloads according to various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include robotic vehicles, systems, and/or methods of transporting payload using a robotic vehicle. Various embodiments include methods and robotic vehicles processing devices implementing such methods for automatically determining whether a payload, held by the robotic vehicle carrying one or more payloads, is securely held or has separated from the robotic vehicle. In addition, various embodiments may include taking actions in response to determining that the payload is not securely held by the robotic vehicle or has separated from the robotic vehicle.

As used herein, the terms "robotic vehicle" and "drone" refer to one of various types of vehicles including an onboard computing device configured to provide some autonomous or semi-autonomous capabilities. Examples of robotic vehicles include but are not limited to: aerial robotic vehicles, such as an unmanned aerial vehicle (UAV); ground vehicles (e.g., an autonomous or semi-autonomous car, a vacuum robot, etc.); water-based vehicles (i.e., vehicles configured for operation on the surface of the water or under water); space-based vehicles (e.g., a spacecraft or space probe); and/or some combination thereof. In some embodiments, the robotic vehicle may be manned. In other embodiments, the robotic vehicle may be unmanned. In embodiments in which the robotic vehicle is autonomous, the robotic vehicle may include an onboard computing device configured to maneuver and/or navigate the robotic vehicle without remote operating instructions (i.e., autonomously), such as from a human operator (e.g., via a remote computing device). In embodiments in which the robotic vehicle is semi-autonomous, the robotic vehicle may include an onboard computing device configured to receive some information or instructions, such as from a human operator (e.g., via a remote computing device), and autonomously maneuver and/or navigate the robotic vehicle consistent with the received information or instructions. In some implementations, the robotic vehicle may be an aerial vehicle (unmanned or manned), which may be a rotorcraft or winged aircraft. For example, a rotorcraft (also referred to as a multirotor or multicopter) may include a plurality of propulsion units (e.g., rotors/propellers) that provide propulsion and/or lifting forces for the robotic vehicle. Specific non-limiting examples of rotorcraft include tricopters (three rotors), quadcopters (four rotors), hexacopters (six rotors), and octocopters (eight rotors). However, a rotorcraft may include any number of rotors.

As used herein, the term "payload" refers to any load carried by the robotic vehicle that may be removed from or repositioned on the robotic vehicle. Payload may include things that are carried by the robotic vehicle, including instruments (e.g., cameras, sensors, etc.), components, and packages (e.g., packages for delivery). Payload may include temporary items, such as items, that are carried by the robotic vehicle for a limited duration. In addition, payload may include long-term or permanent items necessary for the operation of the robotic vehicle. Payloads may be directly secured to the robotic vehicle, such as by a payload attachment device, a compartment, and/or area of the robotic vehicle for holding the payload.

As used herein, the expression "securely held" refers to grasping, carrying, or supporting a payload in a fixed location so as not to move, become loose, not to move more than a specified amount, or become separated from the robotic vehicle. Determinations as to whether a payload is securely held may be based on an expected position of the payload (e.g., corresponding to a last known position of the payload), an amount of force applied to a payload, and/or an amount of resistive force imparted by the payload on a payload securing mechanism configured to keep or sustain the payload in a specified position.

As used herein, the expression, "separated from the robotic vehicle" refers to a payload no longer being carried by a robotic vehicle, i.e., the payload is no longer joined to or touching the robotic vehicle.

As used herein, the term "computing device" refers to an electronic device equipped with at least a processor. Examples of computing devices include processors within a security device, a robotic vehicle and/or a mission management computer that are onboard the robotic vehicle, as well as remote computing devices communicating with the robotic vehicle configured to perform operations of the various embodiments. Computing devices may include wireless communication devices (e.g., cellular telephones, wearable devices, smart-phones, web-pads, tablet computers, Internet enabled cellular telephones, Wi-Fi® enabled electronic devices, personal data assistants (PDAs), laptop computers, etc.), personal computers, and servers. In various embodiments, computing devices may be configured with memory and/or storage. Additionally, computing devices referred to in various example embodiments may be coupled to or include wireless communication capabilities implementing various embodiments, such as network transceiver(s) and antenna(s) configured to establish a local area network (LAN) connection (e.g., Wi-Fi® transceivers).

Figure 1B:
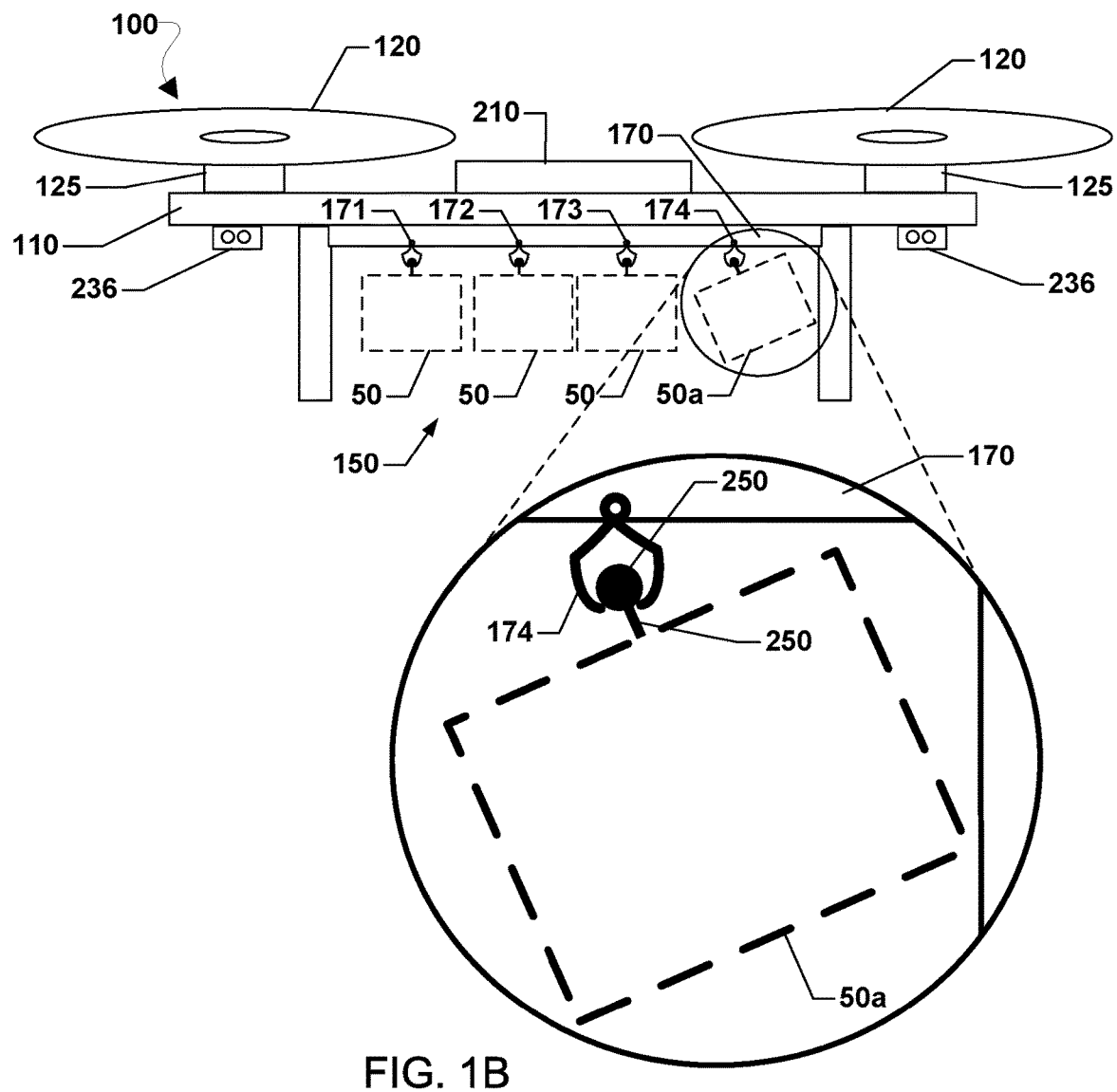
FIG. 1B is a schematic side elevation diagram of the robotic vehicle of FIG. 1A with one of the payloads not securely held by the robotic vehicle in relief according to various embodiments.

Various embodiments may be implemented within a variety of robotic vehicles, an example of which suitable for use with various embodiments is illustrated in FIGS. 1A and 1B. With reference to FIGS. 1A and 1B, a robotic vehicle, such as an aerial robotic vehicle 100, may carry one or more payloads 50 for transport and delivery to one or more locations. The aerial robotic vehicle 100 may also include a plurality of rotors 120 (e.g., four rotors), each driven by a corresponding motor 125, used to enable flight for aerial transportation of the one or more payloads 50. In addition, a body 110 of the aerial robotic vehicle 100 may support the plurality of rotors 120, motors 125, and a payload securing unit 170. The payload securing unit 170 may include one or more grippers 171, 172, 173, 174 for holding a separate one of the one or more payloads 50. Alternatively, the one or more grippers 171, 172, 173, 174 may collectively (i.e., together) secure to one of the payloads 50. For ease of description and illustration, some details of the aerial robotic vehicle 100 are omitted such as wiring, frame structure interconnects or other features that would be known to one of skill in the art.

In various embodiments, processing device 210 may receive an indication of how securely a payload 50 is held by the aerial robotic vehicle 100 or an indication that a payload 50 has separated from the aerial robotic vehicle 100. The indication of how securely the payload 50 is held or whether the payload 50 has separated may depend on the type of sensor providing the indication or whether the indication is derived from a change in a motor load of the aerial robotic vehicle 100.

In various embodiments, the processing device 210 may determine that one or more of the payloads 50 is loose or has separated from the aerial robotic vehicle 100 by detecting a change in motor load on one or more of the motors 125 or a change in lift profile of the aerial robotic vehicle 100, and/or by using one or more onboard sensors. For example, an electronic speed controller in one or more of the motors 125 may indicate load changes that reflect one or more of the payloads 50 are loose. A loose payload (e.g., 50) may cause an increase in drag, which may be detected by a change in the lift profile. Thus, a rise in the motor load of more than a designated increase amount, such as 5%, 10%, 15% (or other threshold), may be considered an indication that one or more of the payload 50 is not securely held by the aerial robotic vehicle 100. Also, a reduction in the motor load of a designated decrease amount may be considered an indication that one or more of the payload 50 has separated. The designated decrease amount may be set based on how much the lightest individual payload element weighs. In response to determining that the payload is not securely held by or has separated from the aerial robotic vehicle 100, the processing device 210 may execute a corrective action.

In various embodiments, the aerial robotic vehicle 100 may include one or more onboard sensors, such as one or more cameras 236, which may provide indications of how securely the one or more payloads 50 are held. Cameras may be disposed in different types of locations on the aerial robotic vehicle 100 and one or more of different types of camera may be used. For example, the cameras 236 may face a payload securing area 150 or be configured to rotate to face the payload securing area 150. The cameras 236 may be configured to monitor the one or more payloads 50 and thus used for visually detecting whether any one of the one or more payloads 50 is moving irregularly, is not positioned appropriately, or is gone completely (i.e., separated from the aerial robotic vehicle 100). The cameras 236 may also be configured to face or rotate to face outwardly for use as navigational aids and/or viewing the surroundings of the aerial robotic vehicle 100. A pair of cameras on the aerial robotic vehicle 100 may be used to perform stereoscopic depth analysis and three-dimensional mapping. One or more markings, such as matrix barcodes, patterns, symbols, shapes, or the like, may be disposed on one or more outer portions of the payloads 50, which may be identified within images from the cameras 236 to detect shifting or separation of the payloads 50. In addition, the aerial robotic vehicle 100 may use the dimensions or shape of the payloads 50 to recognize and locate the payloads 50. A reflective strip (e.g., infrared or ultraviolet reflective) may be included on the payloads 50, such as along edges, to facilitate the determination of the position of each of the payloads 50. In response to determining that the payload has shifted position or has separated from the aerial robotic vehicle 100, the processing device 210 may execute a corrective action.

In various embodiments, the aerial robotic vehicle 100 may include one or more other kinds of onboard sensors, such as contact switches, pressure sensors, communication links that when broken may be used like a sensor, strain gauges, weight sensors, an altimeter, and/or the like for detecting whether one or more of the payloads 50 is out of position (e.g., moving irregularly, not positioned properly, gone completely, etc.). In some embodiments, contact switches and pressure sensors may be used to detect one or more of the payloads 50 is not directly in contact with one of the grippers 171, 172, 173, 174 of the payload securing unit 170 (i.e., an indication part of the payload 50 is loose or completely separated).

In some embodiments, the communication link(s) may be used to detect one or more of the payloads 50 is completely separated from the aerial robotic vehicle 100 (i.e., lost). For example, an a near-field communication (NFC) device (e.g., a radio frequency identifier (RFID) initiator/target pair) attached to both a payload 50 and the aerial robotic vehicle 100, when no longer detected, may indicate a broken short-range communication link, and thus provide an indication that the payload 50 has separated from the aerial robotic vehicle 100.

In some embodiments, the weight sensor may measure a weight of the payload 50, which when no longer detected may provide an indication that the payload 50 has completely separated from the aerial robotic vehicle 100 (i.e., lost). In some embodiments, the altimeter or the like may be used by the processing device 210 to detect flight attitude and/or performance changes that may be associated with the one or more payloads 50 coming loose or separating from the aerial robotic vehicle 100. In response to determining that the payload has shifted position or has separated from the aerial robotic vehicle 100, the processing device 210 may execute a corrective action.

FIG. 1B illustrates a loose payload 50a (i.e., the payload furthest right in the orientation shown and included in the relief view) as having pivoted or shifted out of place. The payload 50a may have pivoted or may be swinging, which may cause the loss of the loose payload 50a or may damage the aerial robotic vehicle 100, the loose payload 50a, or both.

With reference to FIGS. 1A-1B, in various embodiments, the processing device 210 may take a corrective action, such as (but not limited to) adjusting one or more of the grippers 171, 172, 173, 174 to re-secure or better secure the loose payload 50a. For example, the grippers 171, 172, 173, 174 may include a gripping and release mechanism, motor, and so on, that may be strong enough to reliably grasp and hold one or more of the payloads 50. The gripping and release mechanism may include a motor that drives each of the grippers 171, 172, 173, 174 and other controls, which may be responsive to grip and release the payloads 50. For example, the grippers 171, 172, 173, 174 may include an articulating claw, configured to grab and hold a portion of each of the payloads 50. The processing device 210 may be coupled to and configured to control whether the articulating claw is open or closed and how much force the articulating claw imparts on items within the claws. In some embodiments, the payloads 50 may include a protruding coupling element 250 that is configured to be firmly held by the grippers 171, 172, 173, 174. For example, the protruding coupling element 250 may include a thin rigid rod, protruding from a surface of the payload 50, topped with a bulbous element (e.g., a ball) designed to be received and held in the grippers 171, 172, 173, 174. One or more of the grippers 171, 172, 173, 174 may not have been properly closed or may have come loose. To better secure the loose payload, the processing device 210 may increase the amount of force that a particular gripper (e.g., grippers 171, 172, 173, 174) of the payload securing unit 170, applies to the protruding coupling element 250. The increase in the amount of force applied by the grippers 171, 172, 173, 174 may cause the loose payload 50a to return to the proper arrangement (i.e., to be positioned and/or held properly; e.g., as shown in FIG. 1A).

In various embodiments, in response to determining that the payload 50 (50a) is not securely held by the aerial robotic vehicle 100, the processing device 210 may increase power to a magnetic coupling in the payload securing unit 170 to better secure the loose payload 50a. The magnetic coupling may be an electromagnetic lock incorporated into the grippers 171, 172, 173, 174, which generates a magnetic field configured to attract and hold a complementary surface on each of the payloads 50 (e.g., the protruding coupling element 250 or a flat metallic plate). The processing device 210 may regulate an electric current used to open and/or close the electromagnetic lock. To autonomously better secure the loose payload, the processing device 210 may increase the intensity of the magnetic field, to increase the attraction to the protruding coupling element 250. The increase in the magnetic field may cause the loose payload 50a to return to the proper arrangement (i.e., to be positioned and/or held properly; e.g., as shown in FIG. 1A).

In various embodiments, in response to determining that the payload 50 (50a) is not securely held by the aerial robotic vehicle 100, a corrective action that the processing device 210 may take is to adjust a navigation, such as a flight control parameter of the aerial robotic vehicle 100. One or more flight control parameters may affect a flight characteristic of the aerial robotic vehicle 100, such as (but not limited to) speed, acceleration, maneuverability, altitude, and/or the like. For example, the processing device 210 may attempt to prevent the loss or damage of one or more of the payloads 50 by slowing-down, reducing maneuverability, reducing top speed, limiting acceleration, reducing altitude, avoiding dangerous recovery zones, avoiding impractical recovery zones, avoiding a flight path over people and/or creatures, avoiding a flight path over private or restricted property, and/or the like.

In various embodiments, another corrective action that the processing device 210 may take is to activate at least one sensor not currently monitoring the one or more payloads 50. For example, one of the cameras 236 that was not on or not facing the payloads 50 may be activated or turned toward the payloads 50. Yet another corrective action the processing device 210 may take is to transmit a message indicating that one of the payloads 50 (50a) is loose. The message may even request assistance or further instructions. A further corrective action the processing device 210 may take is to determining a landing location for the aerial robotic vehicle 100 to land and directing the aerial robotic vehicle 100 to land at the determined landing location.

Figure 2A:
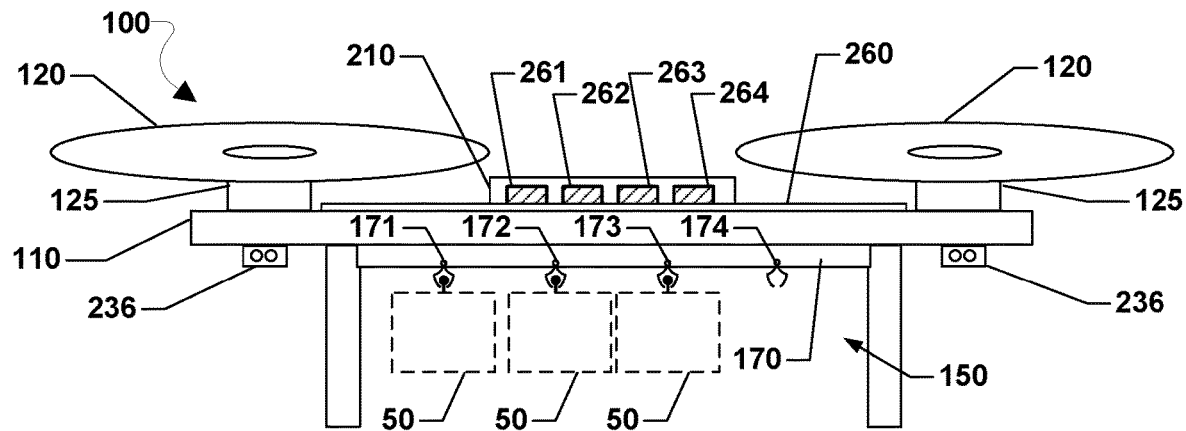
FIG. 2A is a schematic side elevation diagram of a robotic vehicle carrying several payloads with one of the payloads separated from the robotic vehicle according to various embodiments.
Figure 2B:
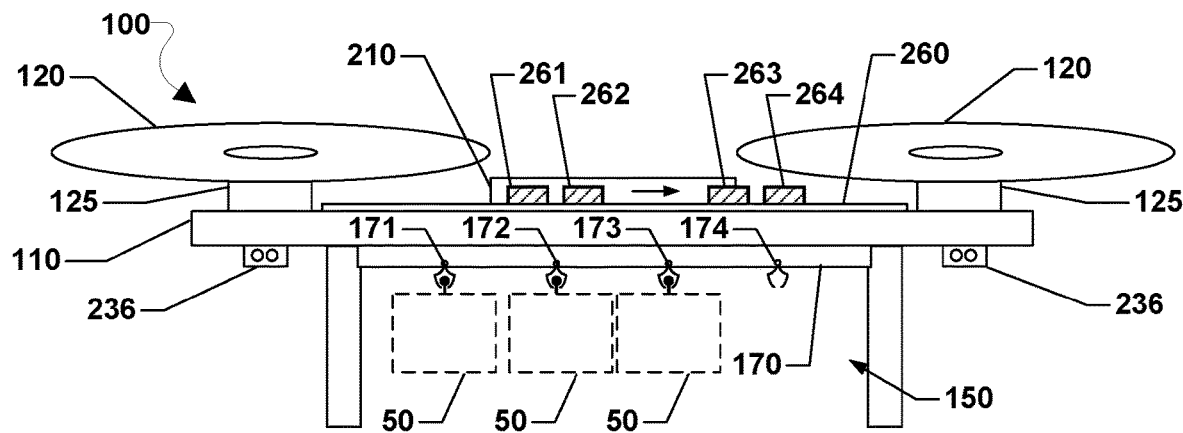
FIG. 2B is a schematic side elevation diagram of the robotic vehicle of FIG. 1A with a position of weights shifted for redistributing weight according to various embodiments.

FIGS. 2A and 2B illustrate exemplary weight adjustment device 260 for the aerial robotic vehicle 100 according to various embodiments. With reference to FIGS. 1-2B, the loss of one or more of the payloads 50 may cause an imbalance for the aerial robotic vehicle 100 that impairs flight mobility, fuel efficiency, and/or makes flight difficult. Thus, the processing device 210 may use the weight adjustment device 260 as part of a corrective action in response to determining that one or more of the payloads 50 has separated from the aerial robotic vehicle 100. The weight adjustment device 260 may include a track that supports various moveable weights 261, 262, 263, 264. The processing device 210 may autonomously adjust a position of one or more of the moveable weights 261, 262, 263, 264 to balance or move a center of gravity of the aerial robotic vehicle 100.

As illustrated in FIGS. 2A and 2B, one of the payloads 50 is gone (i.e., the payload furthest right and held by gripper 174 in FIGS. 1A and 1B). The weight adjustment device 260 may include a motor, gears, chains, and/or pulleys that move one or more of the moveable weights 261, 262, 263, 264 along a base track. The processing device 210 may be coupled to the weight adjustment system and configured to control a position of each of the moveable weights 261, 262, 263, 264. In FIG. 2A, the loss of one of the payloads 50 has caused a shift in the center of gravity (i.e., to the left in the configuration shown in FIG. 2A). To autonomously balance the aerial robotic vehicle 100, the processing device 210 may adjust a position of one or more of the moveable weights 261, 262, 263, 264. For example, in FIG. 2B the processing device 210 has moved the two right-most moveable weights 263, 264 toward the right.

Figure 3:
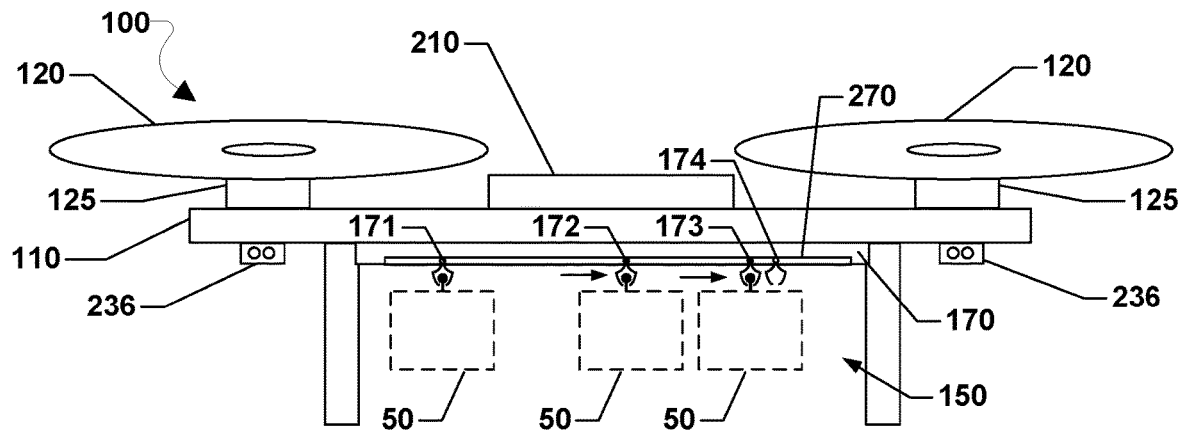
FIG. 3 is a schematic side elevation diagram of a robotic vehicle with a position of some of the payloads shifted for redistributing weight according to various embodiments.

FIG. 3 illustrates another exemplary weight adjustment system 270 for the aerial robotic vehicle 100 according to various embodiments. The processing device 210 may use the weight adjustment system 270 as part of a corrective action in response to determining that the payload has separated from the aerial robotic vehicle 100. With reference to FIGS. 1-3, the weight adjustment system 270 may include a track, motor, gears, chains, and/or pulleys that moveably support individual ones of the grippers 171, 172, 173, 174 of the payload securing unit 170. The processing device 210 may autonomously adjust a position of one or more of the grippers 171, 172, 173, 174, along with a corresponding payload 50 carried therein, to balance or move a center of gravity of the aerial robotic vehicle 100. In FIG. 3, one of the payloads 50 is gone (i.e., the payload furthest right and held by gripper 174 in FIGS. 1A and 1B), leaving an empty gripper 174 of the payload securing unit 170. In response to determining that one of the payloads 50 is gone (i.e., lost), the processing device 210 has moved, toward the right, the three right-most grippers 172, 173, 174, and the two payloads 50 carried therein, which may balance the aerial robotic vehicle 100 by shifting a center of gravity toward the right.

Figure 4:
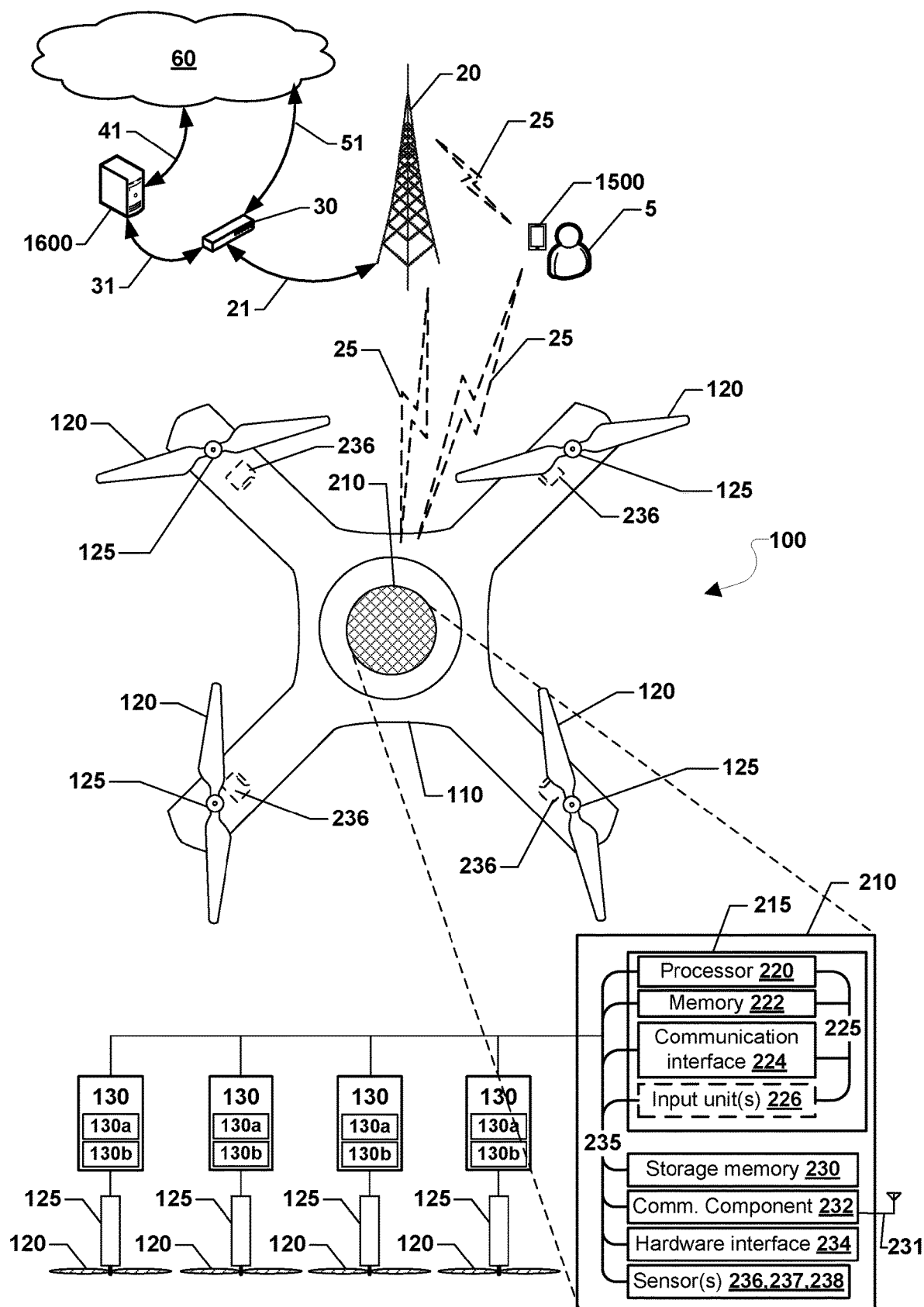
FIG. 4 is a diagram illustrating components of a robotic vehicle suitable for use with various embodiments.

Various embodiments may be implemented within a variety of robotic vehicles, an example of which that is suitable for use with various embodiments is illustrated in FIG. 4. With reference to FIGS. 1-4, the illustrated robotic vehicle, such as the aerial robotic vehicle 100, is a quad copter-style horizontal rotor type aerial robotic vehicle (a.k.a., a "drone"), which may fly in any unobstructed horizontal and vertical direction or may hover in one place. A robotic vehicle may be configured with processing and communication devices that enable the robotic vehicle to navigate, such as by controlling the motors to move, or in the case of an aerial robotic vehicle to achieve flight directionality, and to receive position information and information from other system components including vehicle systems, package delivery service servers and so on. The position information may be associated with the current robotic vehicle position, the robotic vehicle delivery destination, or other locations associated with the robotic vehicle, and the payloads 50.

The aerial robotic vehicle 100 may include the processing device 210 that is configured to monitor and control the various functionalities, sub-systems, and/or other components of the aerial robotic vehicle 100. For example, the processing device 210 may be configured to monitor and control various functionalities of the aerial robotic vehicle 100, such as any combination of modules, software, instructions, circuitry, hardware, etc. related to propulsion, navigation, power management, sensor management, and/or stability management.

The processing device 210 may house various circuits and devices used to control the operation of the aerial robotic vehicle 100. For example, the processing device 210 may include a processor 220 that directs the control of the aerial robotic vehicle 100. The processor 220 may include one or more processors configured to execute processor-executable instructions (e.g., applications, routines, scripts, instruction sets, etc.) to control movement (e.g., flight), antenna usage, and other operations of the aerial robotic vehicle 100, including operations of various embodiments. In some embodiments, the processing device 210 may include memory 222 configured to store data (e.g., navigation or flight plans, obtained sensor data, received messages, etc.) as well as non-volatile storage memory 230 configured to store pre-programmed data files (e.g., applications, navigation data, etc.). While the various components of the processing device 210 are illustrated as separate components, some or all of the components (e.g., the processor 220, the memory 222, and other units) may be integrated together in a single device or module, such as a system-on-chip module (e.g., the SoC 215). The processing device 210 may include one or more hardware interfaces 234 for coupling to the SoC 215 or other components.

The processing device 210 may include more than one SoC 215 thereby increasing the number of processors 220 and processor cores. The processing device 210 may also include processors 220 that are not associated with the SoC 215. Individual processors 220 may be multi-core processors. The processors 220 may each be configured for specific purposes that may be the same as or different from other processors 220 of the processing device 210 or SoC 215. One or more of the processors 220 and processor cores of the same or different configurations may be grouped together. A group of processors 220 or processor cores may be referred to as a multi-processor cluster.

The terms "system-on-chip" or "SoC" as used herein refer to a set of interconnected electronic circuits typically, but not exclusively, including one or more processors (e.g., 220), a memory (e.g., 222), and a communication interface (e.g., 224). The SoC 215 may include a variety of different types of processors 220 and processor cores, such as a general purpose processor, a central processing unit (CPU), a digital signal processor (DSP), a graphics processing unit (GPU), an accelerated processing unit (APU), a subsystem processor of specific components of the processing device, such as an image processor for a camera subsystem or a display processor for a display, an auxiliary processor, a single-core processor, and a multicore processor. The SoC 215 may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

The SoC 215 may include one or more processors 220. The processing device 210 may include more than one SoC 215, thereby increasing the number of processors 220 and processor cores. The processing device 210 may also include processors 220 that are not associated with the SoC 215 (i.e., external to the SoC 215). Individual processors 220 may be multi-core processors. The processors 220 may each be configured for specific purposes that may be the same as or different from other processors 220 of the processing device 210 or the SoC 215. One or more of the processors 220 and processor cores of the same or different configurations may be grouped together. A group of processors 220 or processor cores may be referred to as a multi-processor cluster.

The processing device 210 may further include one or more sensor(s) 236, 237, 238, which may be used by the processor 220 to determine flight attitude and location information to control various processes on the aerial robotic vehicle 100. For example, in some embodiments, the processor 220 may use data from sensors 236, 237, 238 (e.g., a light sensor using photo-resistors, photodiodes, and/or phototransistors; a contact switch, a strain gauge, pressure sensor, weight sensor, altimeter, etc.) as an input for the aerial robotic vehicle 100. As a further example, the one or more sensor(s) may include one or more cameras 236, which may be used for a variety of applications. For example, the camera 236 may be used to facilitate navigation, such as enabling the aerial robotic vehicle 100 to follow or navigate toward an identified feature such as a road intersection. The camera 236 may be used for other purposes such as location identification, guiding the aerial robotic vehicle 100 to land at a drop-off position at a delivery destination, photographing or identifying the recipient of the package or credentials presented by the recipient, and so on. One or more other input units 226 may also be coupled to the processor 220. Various components within the processing device 210 and/or the SoC 215 may be coupled together by various circuits, such as a bus 225, 235 or another similar circuitry.

The processing device 210 may be coupled to each of the plurality of rotors 120 by way of the corresponding motors 125. Optionally, each of the motors 125 may communicate with a sub-controller 130 that may handle functions including controlling aspects of the operation of the rotor's associated motor 125. Each sub-controller 130 may include a local processor 130a configured to execute processor-executable instructions that may be stored in a local memory 130b.

In various embodiments, the processing device 210 may include or be coupled to one or more communication components 232, to enable wireless communication with networks and devices through one or more wireless communication links 25. Such communication components 232 may include a wireless transceiver, an onboard antenna, and/or the like for transmitting and receiving wireless signals. The one or more communication components 232 may be coupled to the communication interface 224 and may be configured to handle wireless wide area network (WWAN) communication signals (e.g., cellular data networks) and/or wireless local area network (WLAN) communication signals (e.g., Wi-Fi signals, Bluetooth signals, etc.) associated with ground-based transmitters/receivers (e.g., base stations, beacons, Wi-Fi access points, Bluetooth beacons, small cells (picocells, femtocells, etc.), etc.). The one or more communication components 232 may receive data from radio nodes, such as navigation beacons (e.g., very high frequency (VHF) omni-directional range (VOR) beacons), Wi-Fi access points, cellular network base stations, radio stations, etc.

The processing device 210, using the processor 220, the one or more communication components 232, and an antenna 231 may be configured to conduct wireless communications with a variety of wireless communication devices, examples of which include the base station 20 or cell tower, a beacon, server, a smartphone 1500, a tablet, or another computing device with which the aerial robotic vehicle 100 may communicate. The processor 220 may establish the wireless communication link 25 with a base station 20 or mobile device (e.g., a smartphone 1500) via the communication components 232 and the antenna 231. In some embodiments, the one or more communication component 232 may be configured to support multiple connections with different wireless communication devices using different radio access technologies. In some embodiments, the one or more communication component 232 and the processor 220 may communicate over a secured communication link. The security communication links may use encryption or another secure means of communication to secure the communication between the one or more communication component 232 and the processor 220.

The base station 20 may provide the wireless communication link 25, which may be a bi-directional link, such as through wireless signals to the aerial robotic vehicle 100. The base station 20 may be coupled via a wired communication link 21 to a network access center 30 that provides one or more wired and/or wireless communications connections 31, 51 to a communication network 60 (e.g., the Internet) and/or remote servers 1600. The communication network 60 may in turn provide access to a remote server 1600 over a wired network connection 41 and/or wireless communications connections (not shown).

The remote computing device 1500 may be configured to control the base station 20, the aerial robotic vehicle 100, and/or control wireless communications over a wide area network, such as providing a wireless access point and/or other similar network access points using the base station 20. In addition, the remote computing device 1500 and/or the communication network 60 may provide access to a remote server 1600. The aerial robotic vehicle 100 may be configured to communicate with the remote computing device 1500 and/or the remote server 1600 for exchanging various types of communications and data, including location information, navigational commands, data inquiries, and mission data.

The terms "server" or "remote server" are used herein interchangeably to refer to any computing device capable of functioning as a server, such as a master exchange server, web server, and a personal or mobile computing device configured with software to execute server functions (e.g., a "light server"). Thus, various computing devices may function as a server 1600, such as any one or all of cellular telephones, smart-phones, web-pads, tablet computers, Internet enabled cellular telephones, wide area network (WAN) enabled electronic devices, laptop computers, personal computers, a computing device specific to the base station 20, the remote computing device 1500, and similar electronic devices equipped with at least a processor, memory, and configured to communicate with a robotic vehicle. The server 1600 may be a dedicated computing device or a computing device including a server module (e.g., running an application that may cause the computing device to operate as a server). A server module (or server application) may be a full function server module, or a light or secondary server module (e.g., light or secondary server application). A light server or secondary server may be a slimmed-down version of server type functionality that can be implemented on a personal or mobile computing device, such as a smart phone, thereby enabling it to function as an Internet server (e.g., an enterprise e-mail server) to a limited extent, such as necessary to provide the functionality described herein.

Alternatively, the aerial robotic vehicle 100 may be configured to communicate directly with the mobile computing device 1500 using the wireless communication link 25, which provides long-range wireless communications to receive instructions. The wireless communication link 25 may be established between the onboard antenna 231 of the communication component 232 and the mobile computing device 1500. The communication component 232 may be configured to receive GPS signals from a satellite or other signals used by the aerial robotic vehicle 100.

The mobile computing device 1500 may be a device located in a remote facility controlled by an operator of the aerial robotic vehicle 100 or may be a device associated with a recipient of the payload (e.g., 50) being delivered. The mobile computing device 1500 may alternatively be a server associated with the package delivery service or operator of the aerial robotic vehicle 100. The communication component 232 may support communications with multiple ones of the mobile computing device 1500.

The wireless communication link 25 may allow an operator or remote controller 5 to communicate (e.g., providing navigational commands, instructions, or exchanging other data) with the aerial robotic vehicle 100 via the base station 20 or directly. The wireless communication link 25 may include a plurality of carrier signals, frequencies, or frequency bands, each of which may include a plurality of logical channels. The wireless communication link 25 may utilize one or more radio access technologies (RATs). Examples of RATs that may be used in the wireless communication link 25 include 3GPP Long Term Evolution (LTE), 3G, 4G, 5G, Global System for Mobility (GSM), Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the mission environment include medium range protocols such as Wi-Fi, LTE-U, LTE-Direct, LAA, MuLTEfire, and relatively short-range RATs such as ZigBee, Bluetooth, and Bluetooth Low Energy (LE).

Robotic vehicles, such as the aerial robotic vehicle 100, may navigate or determine positioning using altimeters or navigation systems, such as Global Navigation Satellite System (GNSS), Global Positioning System (GPS), etc. In some embodiments, the aerial robotic vehicle 100 may use an alternate source of positioning signals (i.e., other than GNSS, GPS, etc.). The aerial robotic vehicle 100 may use position information associated with the source of the alternate signals together with additional information (e.g., dead reckoning in combination with last trusted GNSS/GPS location, dead reckoning in combination with a position of the aerial robotic vehicle takeoff zone, etc.) for positioning and navigation in some applications. Thus, the aerial robotic vehicle 100 may navigate using a combination of navigation techniques, including dead-reckoning, camera-based recognition of the land features below and around the aerial robotic vehicle 100 (e.g., recognizing a road, landmarks, highway signage, etc.), etc. that may be used instead of or in combination with GNSS/GPS location determination and triangulation or trilateration based on known locations of detected wireless access points.

In some embodiments, the processing device 210 of the aerial robotic vehicle 100 may use one or more of various input units 226 for receiving control instructions, data from human operators or automated/pre-programmed controls, and/or for collecting data indicating various conditions relevant to the aerial robotic vehicle 100. For example, the input units 226 may receive input from one or more of various components, such as camera(s), microphone(s), position information functionalities (e.g., a global positioning system (GPS) receiver for receiving GPS coordinates), flight instruments (e.g., attitude indicator(s), gyroscope(s), anemometer, accelerometer(s), altimeter(s), compass(es), etc.), keypad(s), etc. The camera(s) may be optimized for daytime and/or nighttime operation.

Various embodiments may be implemented within a variety of communication networks, such as private networks between computing devices, public networks between computing devices, or combinations of private and public networks, as well as cellular data networks and satellite communication networks. A robotic vehicle may travel over varying distances over varying terrain including roadways. Therefore, the robotic vehicle may require communications to be maintained while the robotic vehicle is travelling toward a destination in either a docked, moving, landed, and/or flying state.

Figure 5:
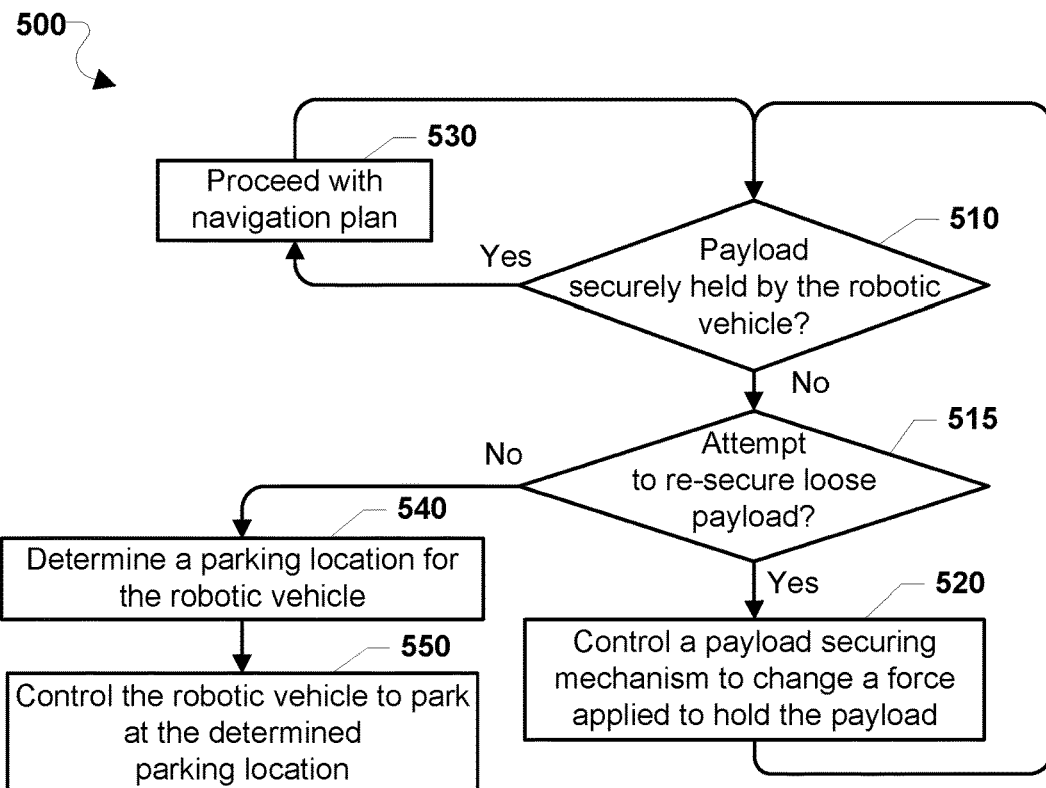
FIG. 5 is a process flow diagram illustrating a method of delivering an item via a robotic vehicle that controls a payload securing mechanism according to various embodiments.

FIG. 5 illustrates a method 500 of transporting a payload (e.g., 50) using a robotic vehicle (e.g., the aerial robotic vehicle 100), according to various embodiments. With reference to FIG. 1-5, operations of the method 500 may be performed by a processing device (e.g., 210) of the robotic vehicle or other computing device (e.g., mobile computing device 1500 or server 1600). To perform the operations of the method 500, the robotic vehicle may communicate with the mobile computing device 1500 and/or the server 1600 to take a corrective action in response to determining that the payload is not securely held by the robotic vehicle.

In determination block 510, the processor may determine whether the payload of the one or more payloads is securely held by the robotic vehicle based on a received indication of how securely the payload is held by the robotic vehicle. The processor may receive the indication of whether a payload (or each payload from among a plurality of payloads) is securely held by the robotic vehicle from a sensor onboard the robotic vehicle. For example, the received indication may include camera images that show a payload shifting slightly (i.e., not securely held). As a further example, the received indication may include one sensor reading that represents where the payload is held by the robotic vehicle or that represent a shift in position of a payload or represents a payload securing unit (e.g., 170) element that is not closed or improperly closed, which may also mean the payload is not securely held. As a further example, the processor may receive signals from an onboard motor reflecting a change in motor load or a change in lift profile. As a further example, the received indication may show all systems and/or payloads are in their normal state, which may mean the payload is securely held.

In response to determining that the payload is securely held by the robotic vehicle (i.e., determination block 510="Yes"), the processor may proceed with a current navigation plan in block 530. The current navigation plan may include a planned route to one or more destinations, as well as various settings, such as navigation parameters for controlling the robotic vehicle en route to the one or more destinations, including maneuvering, power expenditures, etc.

In response to determining that the payload is not securely held by the robotic vehicle (i.e., determination block 510="No"), the processor may make a determination as to whether an attempt should be made to re-secure the loose payload in determination block 515.

In determination block 515, the processor may take into account various conditions, such as whether one or more previous attempts to re-secure the loose payload where successful or unsuccessful. For example, if corrective actions to re-secure the loose payload have previously been unsuccessfully attempted or unsuccessfully attempted a threshold number of times (e.g., three times), the processor may determine that no further attempts to re-secure the loose payload should be made. As a further example, if the indication of how securely the payload is held, used in determination block 510, indicates the payload may imminently separate (i.e., fall off) or is otherwise at risk of compromising the payload and/or the robotic vehicle, the processor may determine that no attempts or further attempts to re-secure the loose payload should be made. As a further example, the indication of how securely the payload is held, used in determination block 510, may indicate the robotic vehicle is no longer airworthy and should immediately land, which means that no attempts should be made to re-secure the loose payload.

In response to determining that no attempt should be made to re-secure the loose payload (i.e., determination block 515="No"), the processor may determine a location for the robotic vehicle to park (i.e., a parking location) in block 540. In the case of an aerial robotic vehicle (e.g., 100), the parking location may be a landing location. In the case of an emergency (e.g., where the robotic vehicle should stop or land as soon as possible), the parking location may be any suitable location, such as coming to an immediate stop, stopping, near the robotic vehicle's current location, or returning to the location from which the robotic vehicle departed. In the case of an aerial robotic vehicle, the parking location may be immediately below or a brief flight from the aerial robotic vehicle's current location. Once the parking location for the robotic vehicle is determined in block 550, the processor may control the robotic vehicle to park at the determined parking location.

In response to determining that an attempt should be made to re-secure the loose payload (i.e., determination block 515="Yes"), the processor may control a payload securing mechanism to change a force applied to hold the payload in block 520. Once the processor initiates the change a force, applied to hold the payload, by the payload securing mechanism in block 520, or after proceeding with the navigation plan in block 530, the processor may determine whether the payload of the one or more payloads is securely held by the robotic vehicle in determination block 510.

In some embodiments, the processor may repeat the operations of the method 500 to detect and respond to one or more payloads that get loose or lost from the robotic vehicle. For example, the processor may repeat the operations of the method 500 until landing at a destination or after all payloads are removed. As another example, the processor may repeat the operations of the method 500 at regular intervals while navigating (e.g., during flight), for a predefined number of iterations indicated in a navigation plan, or at other times established for doing so.

Figure 6:
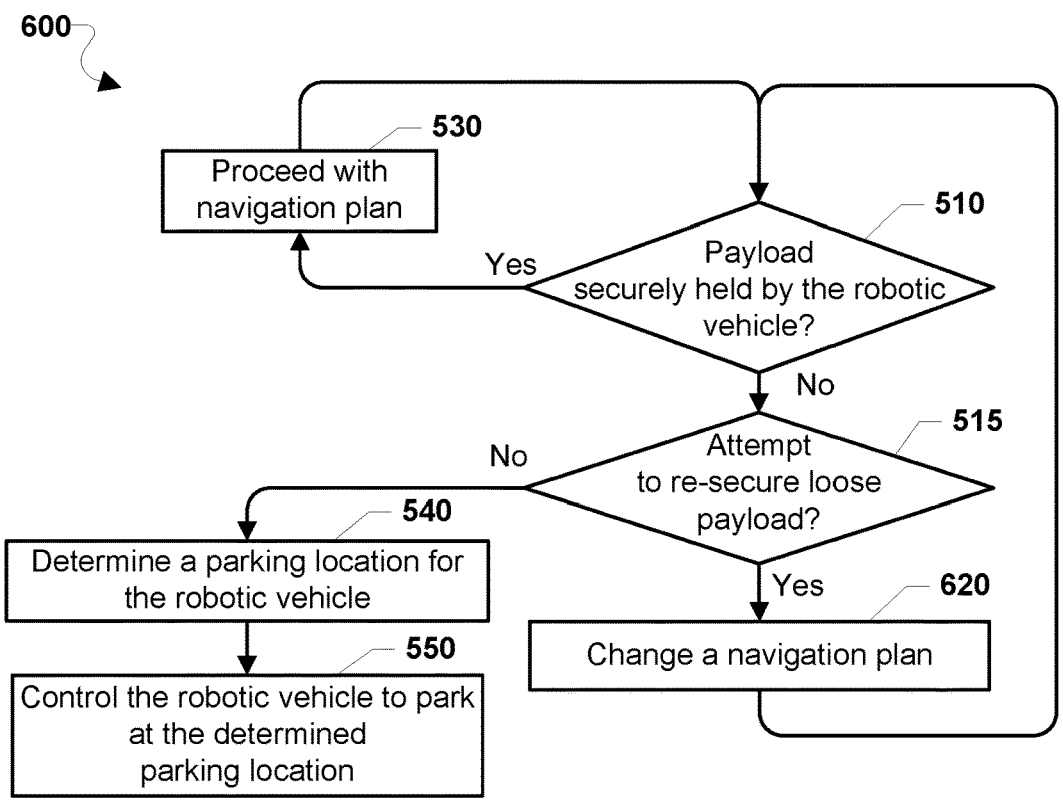
FIG. 6 is a process flow diagram illustrating a method of delivering an item via a robotic vehicle that changes a navigation parameter according to various embodiments.

FIG. 6 illustrates a method 600 of transporting a payload (e.g., 50) using a robotic vehicle (e.g., the aerial robotic vehicle 100) according to various embodiments. With reference to FIG. 1-6, operations of the method 600 may be performed by a processing device (e.g., 210) of the robotic vehicle or other computing device (e.g., mobile computing device 1500 or server 1600). To perform the operations of the method 600, the robotic vehicle may communicate with the mobile computing device 1500 and/or the server 1600 to take a corrective action in response to determining that the payload is not securely held by the robotic vehicle. In the method 600, the processor may perform operations of blocks 530, 540, and 550, and determination blocks 510 and 515, of the method 500 as described.

In response to determining that an attempt should be made to re-secure the loose payload (i.e., determination block 515="Yes"), the processor may change a navigation plan in block 620. The change in navigation plan may include adding a maneuver, changing a route, or changing how the robotic vehicle moves or travels. The added maneuver may include an abrupt turn or other sudden movement intended to adjust a position of the payload carried by the robotic vehicle. The change in route may select a new destination or the path to get to a planned destination, such as avoiding dangerous recovery zones, avoiding impractical recovery zones, avoiding a route through or over an occupied area, and avoiding one or more properties. Changing how the robotic vehicle moves or travels may include slowing-down, reducing maneuverability, reducing top speed, limiting acceleration, reducing altitude (i.e., for an aerial robotic vehicle), change speed, acceleration, altitude, or other navigation control parameters.

Once the processor initiates the change in navigation plan in block 620, or after proceeding with the navigation plan in block 530, the processor may determine whether the payload of the one or more payloads is securely held by the robotic vehicle in determination block 510.

In some embodiments, the processor may repeat the operations of the method 600 to detect and respond to one or more payloads that get loose or lost from the robotic vehicle. For example, the processor may repeat the operations of the method 600 until landing at a destination or after all payloads are removed. As another example, the processor may repeat the operations of the method 600 at regular intervals during navigation, for a predefined number of iterations indicated in a navigation plan, or at other times established for doing so.

Figure 7:
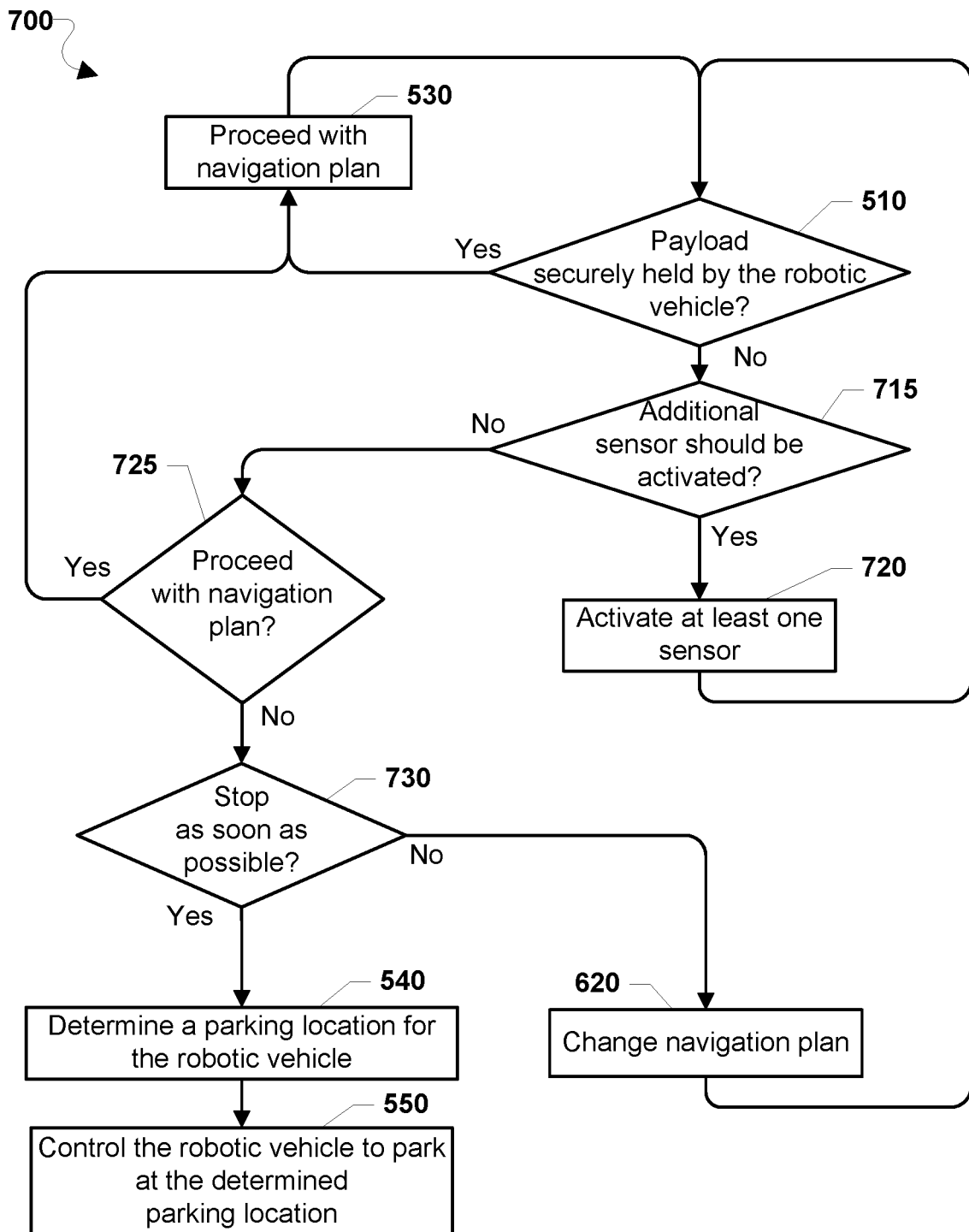
FIG. 7 is a process flow diagram illustrating a method of delivering an item via a robotic vehicle that activates at least one sensor according to various embodiments.

FIG. 7 illustrates a method 700 of transporting a payload (e.g., 50) using a robotic vehicle (e.g., the aerial robotic vehicle 100), according to various embodiments. With reference to FIG. 1-7, operations of the method 700 may be performed by a processing device (e.g., 210) of the robotic vehicle or other computing device (e.g., mobile computing device 1500 or server 1600). To perform the operations of the method 700, the robotic vehicle may communicate with the mobile computing device 1500 and/or the server 1600 to take a corrective action in response to determining that the payload is not securely held by the robotic vehicle. In the method 700, the processor may perform operations of blocks 530, 540, and 550, and determination block 510, of the method 500, and block 620 of the method 600 as described.

In response to determining that the payload is not securely held (i.e., determination block 510="No"), the processor may determine whether an additional sensor should be activated in determination block 715.

In response to determining that no additional sensor should be activated (i.e., determination block 715="No"), the processor may determine whether the robotic vehicle should proceed with a current navigation plan in determination block 725.

In determination block 725, the processor may take into account various conditions in order to assess whether the robotic vehicle should maintain a current navigation plan. For example, the received indication used in determination block 510, may reflect that the robotic vehicle is unstable, such as due to imbalances or damage, and should immediately park or land in the case of an aerial robotic vehicle. As a further example, if the indication that the payload is not securely held used in determination block 510 indicates that one or more other payloads may separate (i.e., fall off) at any time or is/are otherwise at risk of compromising the other payloads and/or the robotic vehicle, the processor may determine that the robotic vehicle should not proceed with the current navigation plan.

In response to determining that the payload is securely held by the robotic vehicle (i.e., determination block 510="Yes") or that the robotic vehicle should proceed with the current navigation plan (i.e., determination block 725="Yes"), the processor may proceed with a current navigation plan in block 530.

In response to determining that the robotic vehicle should not proceed with the current navigation plan (i.e., determination block 725="No"), the processor may determine whether the robotic vehicle should stop as soon as possible in determination block 730.

In response to determining that the robotic vehicle should not stop as soon as possible (i.e., determination block 730="No"), the processor may change the navigation plan in block 620.

In response to determining that the robotic vehicle should stop as soon as possible (i.e., determination block 730="Yes"), the processor may determine a location for the robotic vehicle to park (i.e., a parking location) in block 540. In the case of an aerial robotic vehicle (e.g., 100), the parking location may be a landing location. In the case of an emergency, the parking location may mean coming to an immediate stop, stopping near the robotic vehicle's current location, or returning to the location from which the robotic vehicle departed. In the case of an aerial robotic vehicle, the parking location may be immediately below or a brief flight from the aerial robotic vehicle's current location. Once the parking location for the robotic vehicle is determined in block 550, the processor may direct the robotic vehicle to park at the determined parking location.

In response to determining that at least one additional sensor should be activated (i.e., determination block 715="Yes"), the processor may activate at least one sensor in block 720. The at least one activated sensor in block 720 may provide more details regarding whether a payload is loose or has separated.

Once the processor activates the at least one sensor not currently monitoring the payload in block 720, initiates the change in navigation plan in block 620, or after proceeding with the navigation plan in block 530, the processor may determine whether the payload of the one or more payloads is securely held by the robotic vehicle in determination block 510.

In some embodiments, the processor may repeat the operations of the method 700 to detect and respond to one or more payloads that get loose or lost from the robotic vehicle. For example, the processor may repeat the operations of the method 700 until landing at a destination or after all payloads are removed. As another example, the processor may repeat the operations of the method 700 at regular intervals during navigation, for a predefined number of iterations indicated in a navigation plan, or at other times established for doing so.

Figure 8:
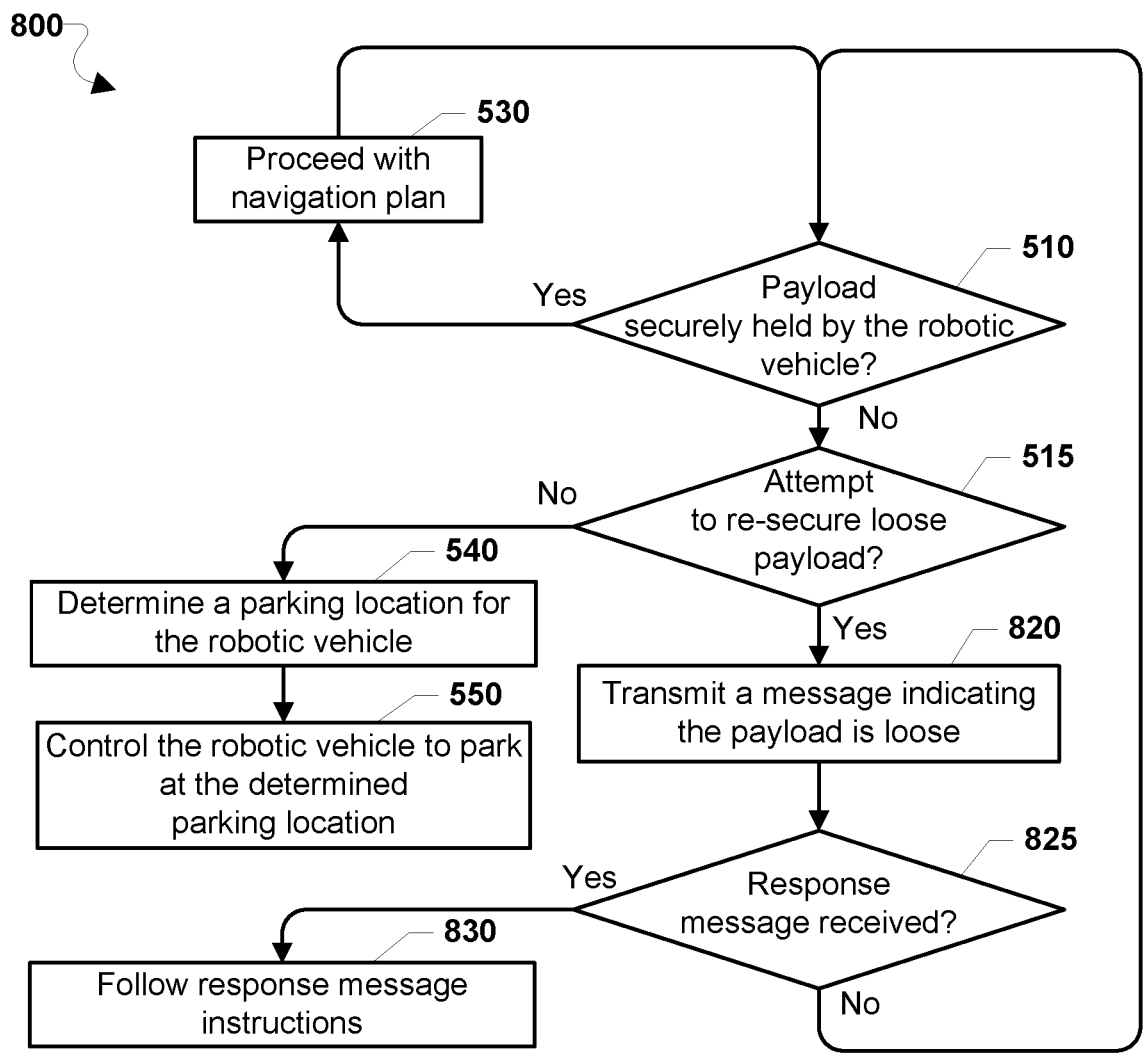
FIG. 8 is a process flow diagram illustrating a method of delivering an item via a robotic vehicle that transmits a message indicating payload is loose according to various embodiments.

FIG. 8 illustrates a method 800 of transporting a payload (e.g., 50) using a robotic vehicle (e.g., the aerial robotic vehicle 100), according to various embodiments. With reference to FIG. 1-8, operations of the method 800 may be performed by a processing device (e.g., 210) of the robotic vehicle or other computing device (e.g., mobile computing device 1500 or server 1600). To perform the operations of the method 800, the robotic vehicle may communicate with the mobile computing device 1500 and/or the server 1600 to take a corrective action in response to determining that the payload is not securely held by the robotic vehicle. In the method 800, the processor may perform operations of blocks 530, 540, and 550, and determination blocks 510 and 515, of the method 500 as described.

In response to determining that an attempt should be made to re-secure the loose payload (i.e., determination block 515="Yes"), the processor may transmit a message indicating the payload is loose in block 820. The transmitted message may also request instructions on how to further proceed or what corrective action should be taken. Once the processor transmits the message indicating the payload is loose in block 820, the processor may determine whether a response message is received in determination block 825.

In response to the processor determining that response message is received in determination block 825 (i.e., determination block 825="Yes"), the processor may follow the response message instructions in block 830. The response message instructions may instruct the processor to repeat the operations of method 800 or one or more of other methods described herein.

In response to the processor determining that no response message is received (i.e., determination block 825="No"), or after proceeding with the navigation plan in block 530, the processor may determine whether the payload of the one or more payloads is securely held by the robotic vehicle in determination block 510.

In some embodiments, while navigating (e.g., in flight), the processor may repeat the operations of the method 800 to detect and respond to one or more payloads that get loose or lost from the robotic vehicle. For example, the processor may repeat the operations of the method 800 until landing at a destination or after all payloads are removed. As another example, the processor may repeat the operations of the method 800 at regular intervals during navigation, for a predefined number of iterations indicated in a navigation plan, or at other times established for doing so.

Figure 9:
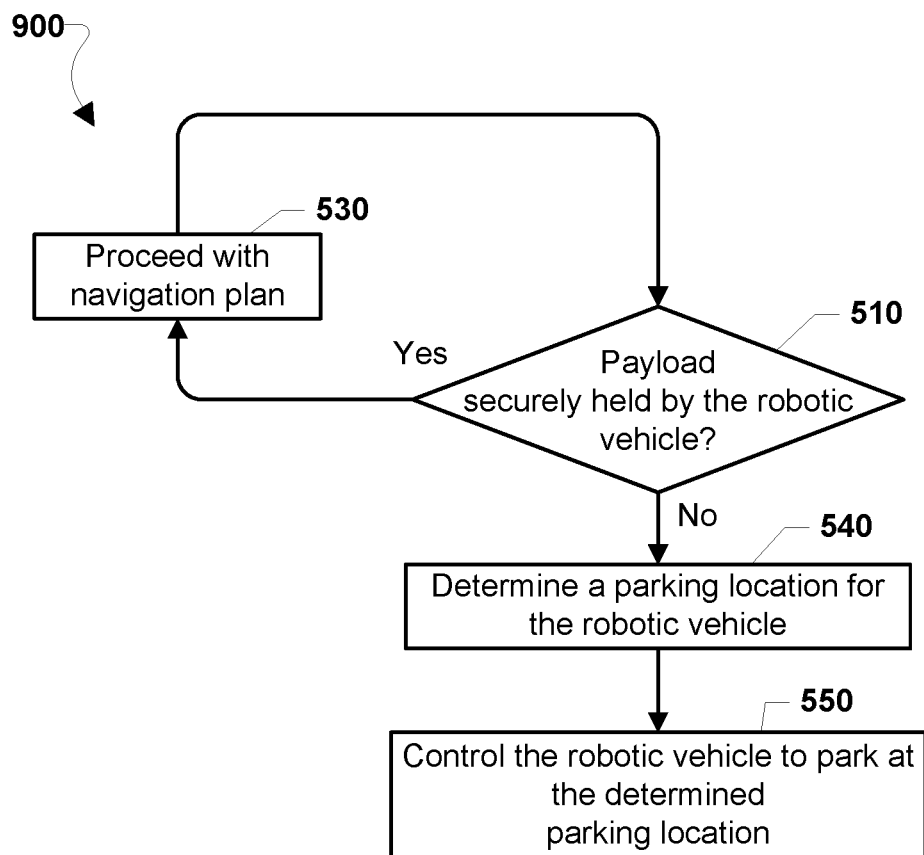
FIG. 9 is a process flow diagram illustrating a method of delivering an item via a robotic vehicle that parks the robotic vehicle according to various embodiments.

FIG. 9 illustrates a method 900 of transporting a payload (e.g., 50) using a robotic vehicle (e.g., the aerial robotic vehicle 100), according to various embodiments. With reference to FIG. 1-9, operations of the method 900 may be performed by a processing device (e.g., 210) of the robotic vehicle or other computing device (e.g., mobile computing device 1500 or server 1600). To perform the operations of the method 900, the robotic vehicle may communicate with the mobile computing device 1500 and/or the server 1600 to take a corrective action in response to determining that the payload is not securely held by the robotic vehicle. In the method 900, the processor may perform operations of blocks 530, 540, and 550, and determination block 510 of the method 500 as described. In this way in the method 900, once the processor determines that the payload is not securely held by the robotic vehicle (i.e., determination block 510="No"), the processor proceeds directly to determining a parking location for the robotic vehicle in block 540.

In some embodiments, while navigating (e.g., in flight), the processor may repeat the operations of the method 900 to detect and respond to one or more payloads that get loose or lost from the robotic vehicle. For example, the processor may repeat the operations of the method 900 until landing at a destination or the determined landing location, or after all payloads are removed. As another example, the processor may repeat the operations of the method 900 at regular intervals during navigation for a predefined number of iterations indicated in a navigation plan, or at other times established for doing so.

Figure 10:
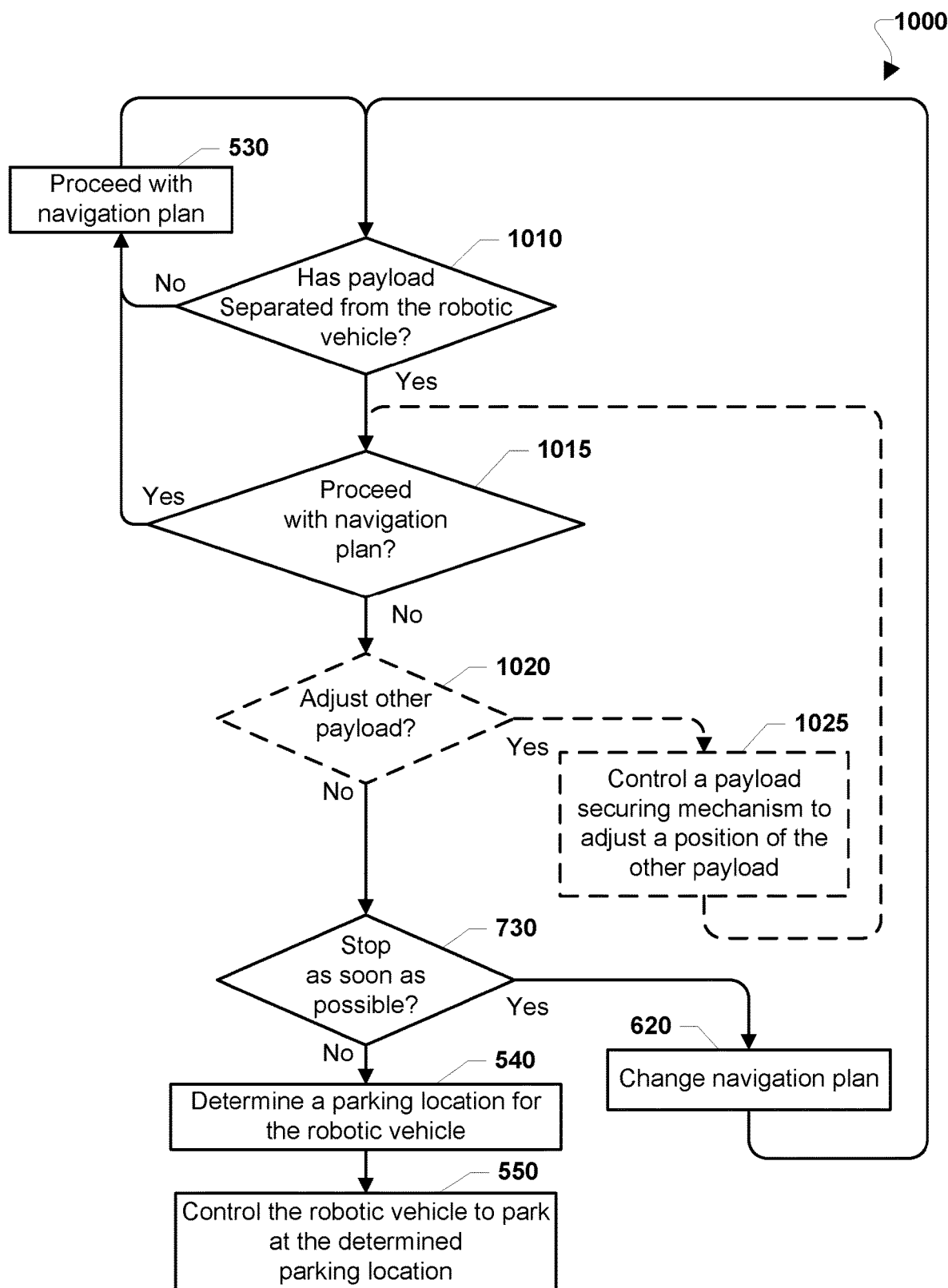
FIG. 10 is a process flow diagram illustrating a method of delivering an item via a robotic vehicle that determines whether the robotic vehicle is airworthy after a payload has separated according to various embodiments.

FIG. 10 illustrates a method 1000 of transporting a payload (e.g., 50) using a robotic vehicle (e.g., the aerial robotic vehicle 100), according to various embodiments. With reference to FIG. 1-10, operations of the method 1000 may be performed by a processing device (e.g., 210) of the robotic vehicle or other computing device (e.g., mobile computing device 1500 or server 1600). To perform the operations of the method 1000, the robotic vehicle may communicate with the mobile computing device 1500 and/or the server 1600 to take a corrective action in response to determining that the payload is not securely held by the robotic vehicle. In the method 1000, the processor may perform operations of blocks 530, 540, and 550 of the method 500, block 620 of the method 600, and determination block 730 of the method 700, as described.

In determination block 1010, the processor may determine whether the payload of the one or more payloads has separated from the robotic vehicle based on a received indication that one or more payloads has separated from the robotic vehicle. The processor may receive signals transmitted from a sensor configured to detect the presence or absence of the one or more payloads. The sensor may be attached to the robotic vehicle (i.e., onboard the robotic vehicle). For example, the received indication may include camera images that show a payload is missing (i.e., payload has separated). As a further example, the processor may receive signals from an onboard motor reflecting a change in motor load (i.e., a significant drop in motor load) or a change in lift profile (i.e., a significant increase in lift). As a further example, the received indication may include one sensor reading that represents a payload has disconnected from a payload securing unit (e.g., 170), which may also mean the payload has separated.

In response to determining that the payload has not separated from the robotic vehicle (i.e., determination block 1010="No"), the processor may proceed with a current navigation plan in block 530. The current navigation plan may include a planned route to one or more destinations, as well as various settings, such as navigation parameters for controlling the robotic vehicle enroute to the one or more destinations, including maneuvering, power expenditures, etc.

In response to determining that the payload has separated from the robotic vehicle (i.e., determination block 1010="Yes"), the processor may determine whether the robotic vehicle should proceed with the current navigation plan in determination block 1015.

In determination block 1015, the processor may take into account various conditions in order to assess whether the robotic vehicle should maintain a current navigation plan. For example, the received indication used in determination block 1010, may reflect that the robotic vehicle is unstable, due to imbalances or damage, and should immediately park or land in the case of an aerial robotic vehicle. As a further example, if the indication that the payload has separated, used in determination block 1010, indicates that one or more other payloads may imminently separate (i.e., fall off) or is/are otherwise at risk of compromising the other payloads and/or the robotic vehicle, the processor may determine that the robotic vehicle should not proceed with the current navigation plan.

In response to determining that the robotic vehicle may proceed with the current navigation plan (i.e., determination block 1015="Yes"), the processor may proceed with a current navigation plan in block 530.

In response to determining that the robotic vehicle should not proceed with the current navigation plan (i.e., determination block 1015="No"), the processor may optionally determine whether another payload onboard the robotic vehicle should be adjusted in optional determination block 1020 or otherwise determine whether to stop as soon as possible in determination block 730. The option to determine whether another payload onboard the robotic vehicle should be adjusted in optional determination block 1020 may be performed when such an option is available or under other designated circumstances.

In optional determination block 1020, the processor may determine whether another payload onboard the robotic vehicle should be adjusted.

In response to determining that another payload onboard the robotic vehicle should be adjusted (i.e., optional determination block 1020="Yes"), the processor may optionally control a payload securing mechanism to adjust a position of the other payload in optional block 1025. The other payload being positionally adjusted may be a temporary payload, such as a package for delivery, or may be a weight configured to adjust a center of gravity of the robotic vehicle. The option to adjust a position of the other payload in optional block 1025 may be performed when such an option is available or under other designated circumstances. Once the adjustment to the position of the other payload is performed in optional block 1025, the processor may once again determine whether the robotic vehicle should proceed with the current navigation plan in determination block 1015.

In response to determining that another payload onboard the robotic vehicle should not be adjusted (i.e., optional determination block 1020="No"), the processor may determine whether the robotic vehicle should stop as soon as possible in determination block 730.

Once the processor changes the navigation plan in block 620, or after proceeding with the navigation plan in block 530, the processor may determine whether the payload of the one or more payloads has separated from the robotic vehicle in determination block 1010.

In some embodiments, the processor may repeat the operations of the method 1000 to detect and respond to one or more payloads that separated from the robotic vehicle. For example, the processor may repeat the operations of the method 1000 until stopping or landing at a destination, parking at a determined parking location, or after all payloads are removed. As another example, the processor may repeat the operations of the method 1000 at regular intervals during navigation, for a predefined number of iterations indicated in a navigation plan, or at other times established for doing so.

Figure 11:
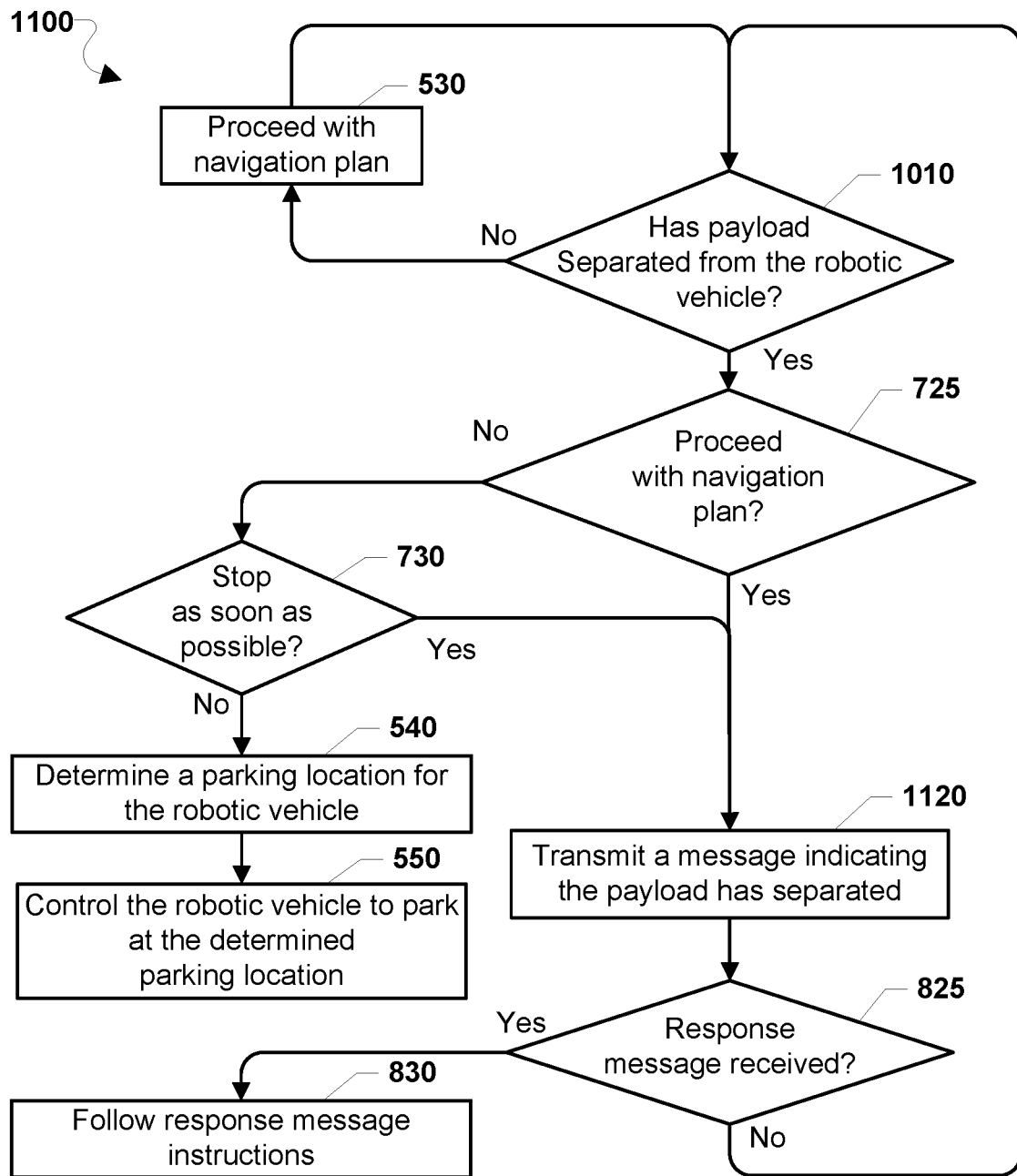
FIG. 11 is a process flow diagram illustrating a method of delivering an item via a robotic vehicle that transmits a message after a payload has separated according to various embodiments.

FIG. 11 illustrates another method 1100 of transporting a payload (e.g., 50) using a robotic vehicle (e.g., the aerial robotic vehicle 100), according to various embodiments. With reference to FIG. 1-11, operations of the method 1100 may be performed by a processing device (e.g., 210) of the robotic vehicle or other computing device (e.g., mobile computing device 1500 or server 1600). To perform the operations of the method 1100, the robotic vehicle may communicate with the mobile computing device 1500 and/or the server 1600 to take a corrective action in response to determining that the payload is not securely held by the robotic vehicle. In the method 1100, the processor may perform operations of blocks 530, 540, and 550 of the method 500; determination blocks 725 and 730 of the method 700, block 830 and determination block 825 of the method 800; and determination block 1010 of the method 1000, as described.

In response to determining that the robotic vehicle should proceed with the current navigation plan (i.e., determination block 725="Yes") or in response to determining the robotic vehicle should stop as soon as possible (i.e., determination block 730="Yes"), the processor may transmit a message indicating the payload has separated in block 1120. The transmitted message may also request instructions on how to further proceed or what corrective action should be taken. Once the processor transmits the message indicating the payload has separated in block 1120, the processor may determine whether a response message is received in determination block 825.

Thus, in the method 1100, once the processor determines that no response message is received (i.e., determination block 825="No"), or after proceeding with the navigation plan in block 530, the processor may determine whether the payload of the one or more payloads has separated from the robotic vehicle in determination block 1010.

In some embodiments, while navigating (e.g., in flight), the processor may repeat the operations of the method 1100 to detect and respond to one or more payloads that get separated from the robotic vehicle. For example, the processor may repeat the operations of the method 1100 until landing at a destination or the determined landing location, or after all payloads are removed. As another example, the processor may repeat the operations of the method 1100 at regular intervals during navigation, for a predefined number of iterations indicated in a navigation plan, or at other times established for doing so.

Figure 12:
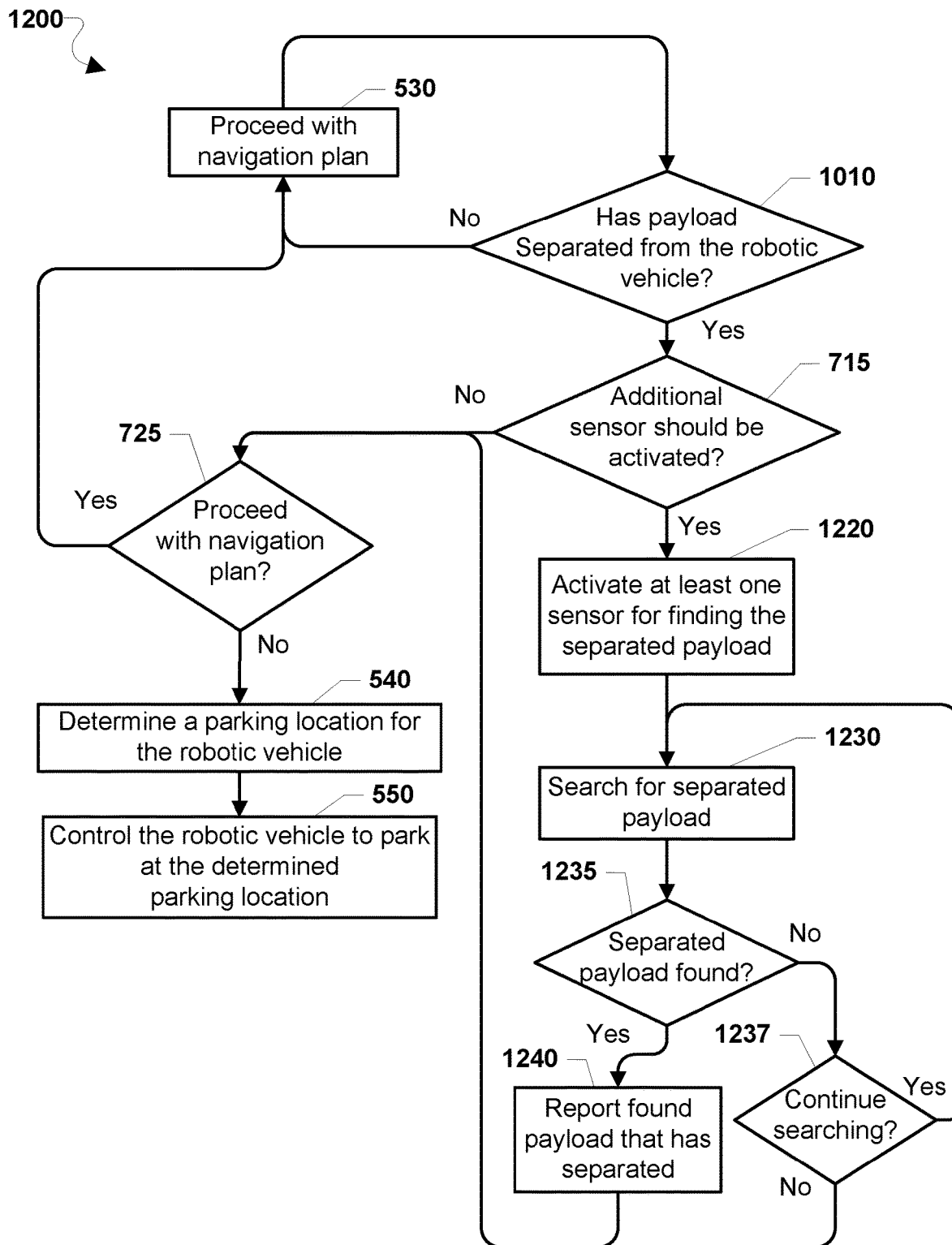
FIG. 12 is a process flow diagram illustrating a method of delivering an item via a robotic vehicle that searches for payload that has separated according to various embodiments.

FIG. 12 illustrates another method 1200 of transporting a payload (e.g., 50) using a robotic vehicle (e.g., the aerial robotic vehicle 100), according to various embodiments. With reference to FIG. 1-12, operations of the method 1200 may be performed by a processing device (e.g., 210) of the robotic vehicle or other computing device (e.g., mobile computing device 1500 or server 1600). To perform the operations of the method 1200, the robotic vehicle may communicate with the mobile computing device 1500 and/or the server 1600 to take a corrective action in response to determining that the payload is not securely held by the robotic vehicle. In the method 1200, the processor may perform operations of blocks 530, 540, and 550 of the method 500, determination blocks 715 and 725 of the method 700, and determination block 1010 of the method 1000, as described.

In response to determining that at least one additional sensor should be activated (i.e., determination block 715="Yes"), the processor may activate at least one sensor for finding the separated payload in block 1220. Once the processor activates the at least one sensor in block 1220, the processor may control the robotic vehicle, using the sensor activated in block 1220, to search for the separated payload in block 1230.

In determination block 1235, the processor may determine whether the separated payload has been found. In some embodiments, the processor may use a camera in conjunction with image analysis to identify the separated payload. Alternatively, the payload may have a beacon or other transmit a wireless signal that may be received by the robotic vehicle.

In response to determining the separated payload has been found (i.e., determination block 1235="Yes"), the processor may use a transmitter to transmit a message indicating the separated payload has been found in block 1240 (i.e., "Report found payload that has separated"). The message may provide a location of the found payload. Additionally, the message may include details regarding whether the separated payload may be damaged or destroyed. The message may request assistance in retrieving or protecting the separated payload.

In response to determining the separated payload has not been found (i.e., determination block 1235="No"), the processor may determine whether to continue searching in determination block 1237.

In response to determining to continue searching (i.e., determination block 1237="Yes"), the processor may control the robotic vehicle to continue searching for the separated payload in block 1230.

In response to determining not to continue searching (i.e., determination block 1237="No"), using the transmitter to transmit a message indicating the separated payload has been found in block 1240, or in response to determining that no additional sensor should be activated (i.e., determination block 715="No"), the processor may determine whether the robotic vehicle should proceed with a current navigation plan in determination block 725.

In some embodiments, while navigating (e.g., in flight), the processor may repeat the operations of the method 1200 to detect and respond to one or more payloads that get separated from the robotic vehicle. For example, the processor may repeat the operations of the method 1200 until landing at a destination or the determined landing location, or after all payloads are removed. As another example, the processor may repeat the operations of the method 1200 at regular intervals during navigation, for a predefined number of iterations indicated in a navigation plan, or at other times established for doing so.

Figure 13:
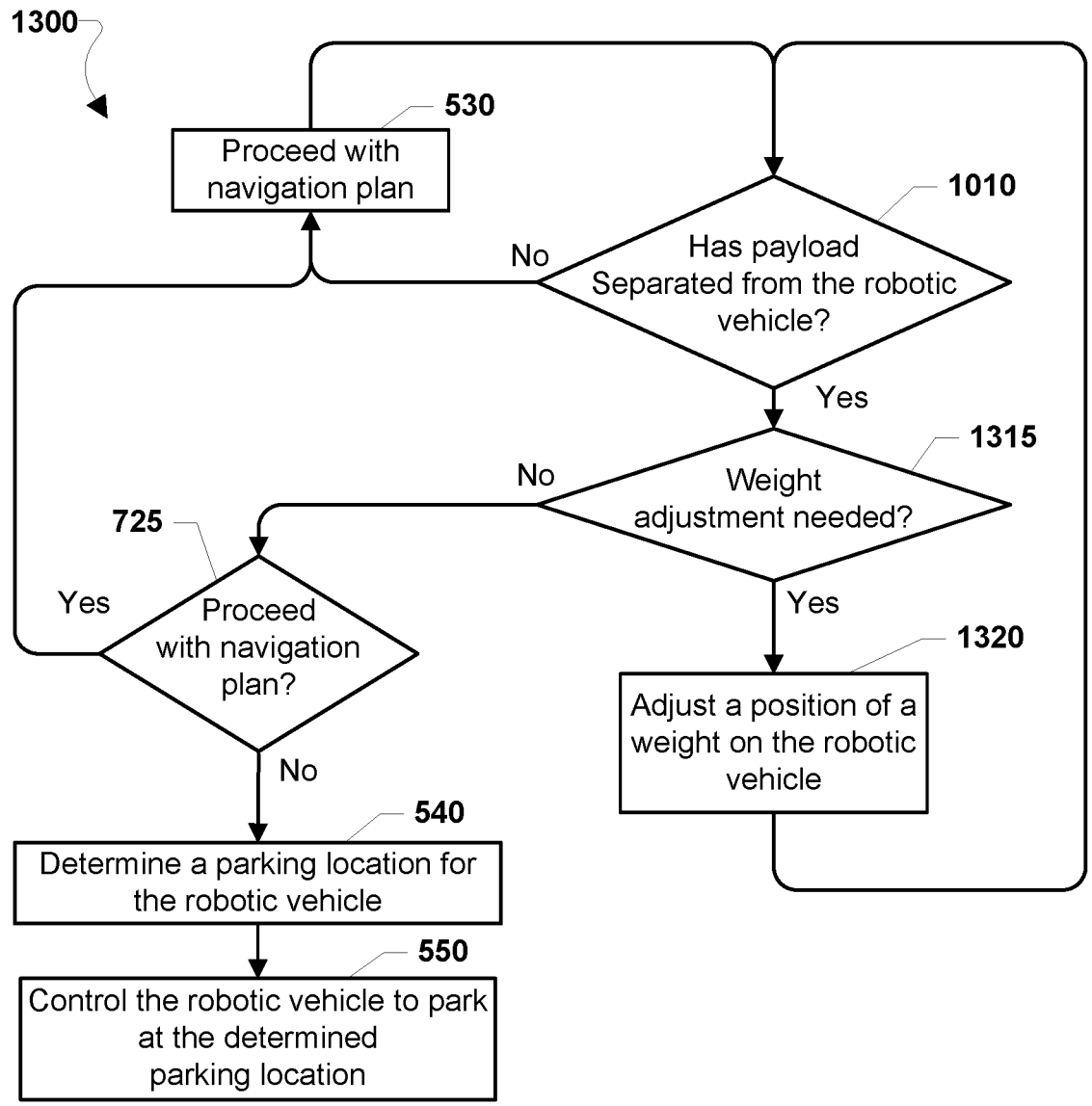
FIG. 13 is a process flow diagram illustrating a method of delivering an item via a robotic vehicle that adjusts a position of a weight on the robotic vehicle according to various embodiments.

FIG. 13 illustrates another method 1300 of transporting a payload (e.g., 50) using a robotic vehicle (e.g., the aerial robotic vehicle 100), according to various embodiments. With reference to FIG. 1-13, operations of the method 1300 may be performed by a processing device (e.g., 210) of the robotic vehicle or other computing device (e.g., mobile computing device 1500 or server 1600). To perform the operations of the method 1300, the robotic vehicle may communicate with the mobile computing device 1500 and/or the server 1600 to take a corrective action in response to determining that the payload is not securely held by the robotic vehicle. In the method 1300, the processor may perform operations of blocks 530, 540, and 550 of the method 500; determination block 725 of the method 700; and determination block 1010 of the method 1000, as described.

In response to determining that the payload has separated from the robotic vehicle (i.e., determination block 1010="Yes"), the processor may determine whether a weight adjustment is needed onboard the robotic vehicle in determination block 1315. A weight adjustment may help balance and/or stabilize the robotic vehicle. The weight adjustment may be performed by activating a payload redistribution device and/or repositioning a weight on the robotic vehicle.

In response to determining that a weight adjustment is not needed (i.e., determination block 1315="No"), the processor may determine whether the robotic vehicle should proceed with a current navigation plan in determination block 725.

In response to determining that a weight adjustment is needed (i.e., determination block 1315="Yes"), the processor may adjust a position of a weight on the robotic vehicle in block 1320. The adjustment of the position of weight on the robotic vehicle may adjust the center of gravity of the robotic vehicle. For example, the processor may activate a weight adjustment device that changes a position of at least one payload that has not separated from the robotic vehicle. As another example, the processor may activate a weight adjustment device that changes a position of at least one weight, not considered at item for delivery, carried by the robotic vehicle as part of a weight adjustment device.

Once the processor activates a mechanism for adjusting a position of one or more weights on the robotic vehicle in block 1320, or after proceeding with the navigation plan in block 530, the processor may determine whether the payload of the one or more payloads has separated from the robotic vehicle in determination block 1010.

In some embodiments, the processor may repeat the operations of the method 1300 to detect and respond to one or more payloads that get separated from the robotic vehicle. For example, the processor may repeat the operations of the method 1300 until landing at a destination or after all payloads are removed. As another example, the processor may repeat the operations of the method 1300 at regular intervals during navigation, for a predefined number of iterations indicated in a navigation plan, or at other times established for doing so.

Figure 14:
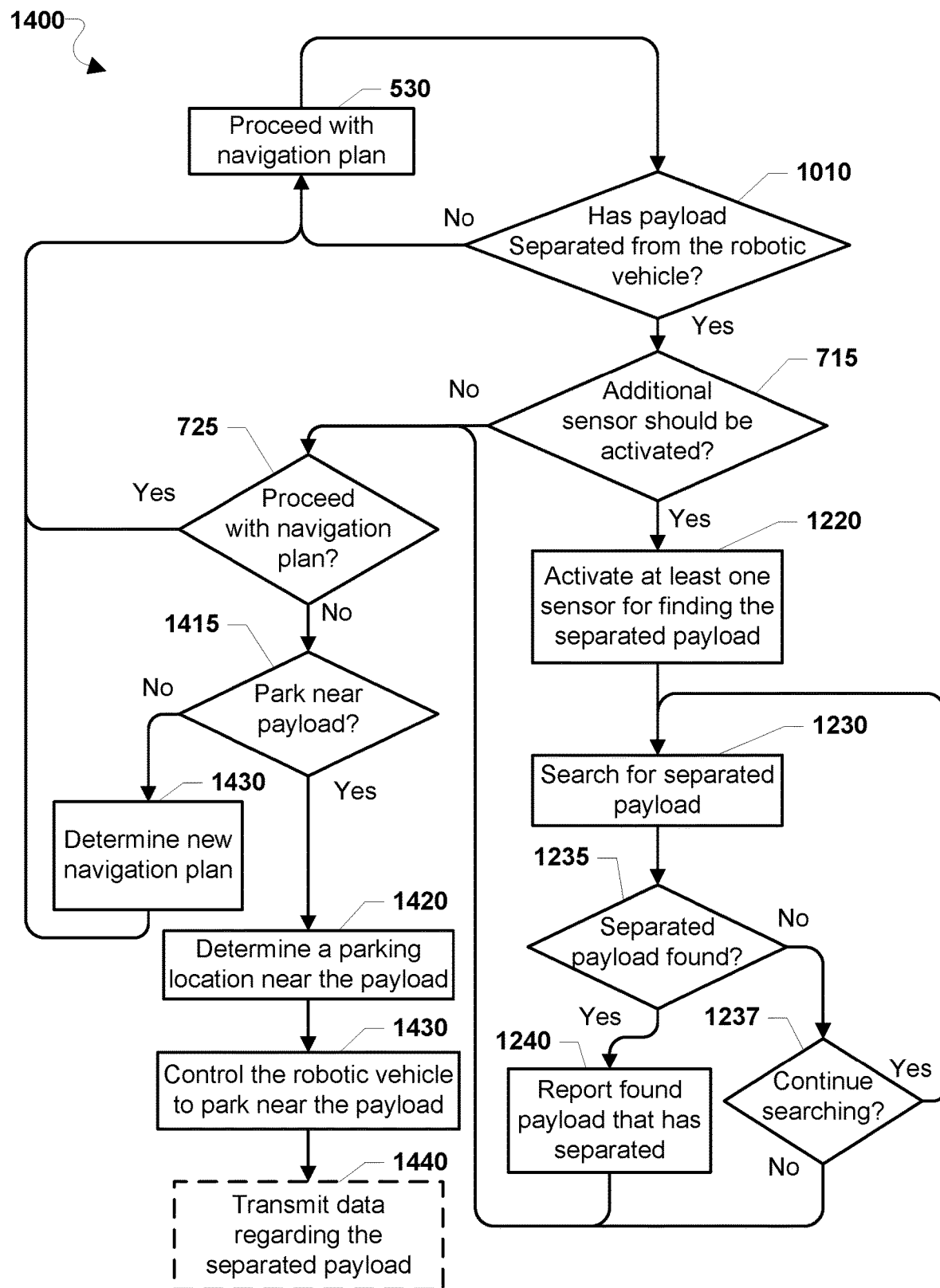
FIG. 14 is a process flow diagram illustrating a method of delivering an item via a robotic vehicle that lands or hovers over or within line of sight of the separated payload according to various embodiments.

FIG. 14 illustrates another method 1400 of transporting a payload (e.g., 50) using a robotic vehicle (e.g., the aerial robotic vehicle 100), according to various embodiments. With reference to FIG. 1-14, operations of the method 1400 may be performed by a processing device (e.g., 210) of the robotic vehicle or other computing device (e.g., mobile computing device 1500 or server 1600). To perform the operations of the method 1400, the robotic vehicle may communicate with the mobile computing device 1500 and/or the server 1600 to take a corrective action in response to determining that the payload is not securely held by the robotic vehicle. In the method 1400, the processor may perform operations of block 530 of the method 500; determination blocks 715 and 725 of the method 700; determination block 1010 of the method 1000; and blocks 1220, 1230, and 1240 and determination blocks 1235 and 1237 of the method 1200, as described.

In response to determining that the robotic vehicle should not proceed with the current navigation plan (i.e., determination block 725="No"), the processor may determine whether to park near the separated payload in determination block 1415. For example, the location of the separated payload may be known from determination block 1235 and as reported in block 1240.

In response to determining not to park near the separated payload (i.e., determination block 1415="No"), the processor may determine a new navigation plan in block 1430. Once a new navigation plan is determined in block 1430, the processor may proceed with the new navigation plan in block 530.

In response to determining to park near the separated payload (i.e., determination block 1415="Yes"), the processor may determine a parking location for the robotic vehicle near the separated payload in block 1420. As used herein, the expression, "near the separated payload" refers to a position in close proximity to or a short distance from a dropped package such that a person or recovery device locating the robotic vehicle will be able to locate the dropped package without having to conduct an extensive search. For example, parking or landing near the separated payload may involve parking or landing within sight of the payload on the ground, which may depend upon the conditions of the surrounding terrain.

In block 1430, the processor may control the robotic vehicle to park in the location near the separated payload. In the case of an aerial robotic vehicle (e.g., 100), the parking location may be on top of or hovering over or within line of sight of the separated payload. The robotic vehicle may land/hover over or on the separated payload to protect the separated payload from tampering and/or serve as a locator for finding the separated payload. Once parked near the separated payload, the robotic vehicle may provide video surveillance (i.e., take photographs or video of the separated payload and/or surrounding area). Similarly, the robotic vehicle may hover over the separated payload or land within line-of-sight of the separated payload to help locate the vicinity in which the separated payload may be found.

In optional block 1440, the processor may use a transmitter to transmit data regarding the separated payload. For example, the processor may transmit surveillance video showing at least one of the separated payload and at least a portion of the area surround the separated payload. The option to use a transmitter to transmit data regarding the separated payload in optional block 1440 may be performed when such an option is available or under other designated circumstances.

In some embodiments, the processor may repeat the operations of the method 1400 to detect and respond to one or more payloads that get separated from the robotic vehicle. For example, the processor may repeat the operations of the method 1400 until landing at a destination, after all payloads are removed, or after landing or hovering over or within line of sight of the separated payload. As another example, the processor may repeat the operations of the method 1400 at regular intervals during navigation, for a predefined number of iterations indicated in a navigation plan, or at other times established for doing so.

Figure 15:
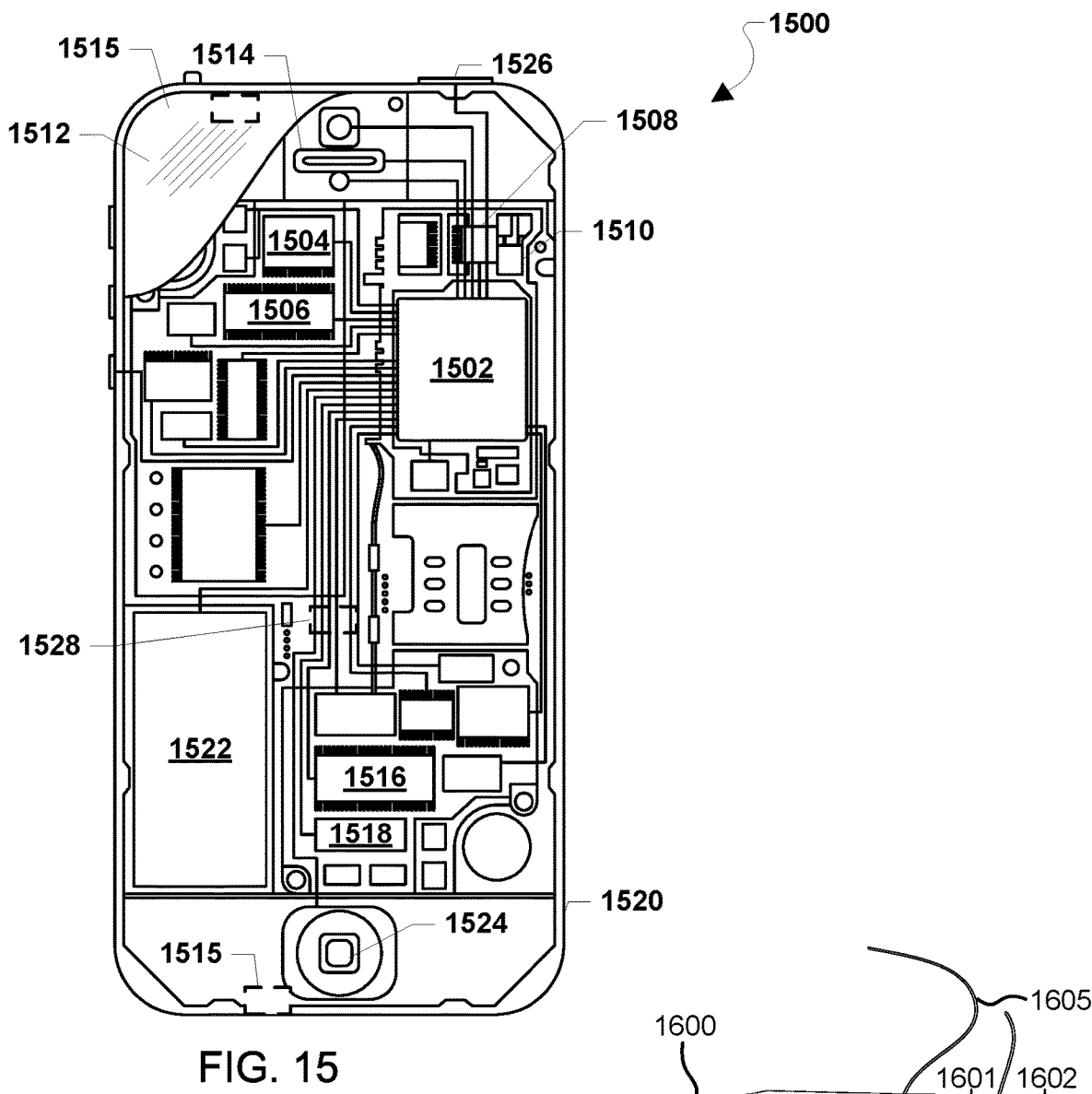
FIG. 15 is a component diagram of a remote computing device in the form of a wireless communication device, suitable for use with various embodiments.

In some embodiments, communications with the robotic vehicle, such as the aerial robotic vehicle (e.g., 100), may involve interactions with any of a variety of mobile computing devices (e.g., smartphones, tablets, smartwatches, etc.) an example of which is illustrated in FIG. 15. The mobile computing device 1500 may include a processor 1502 coupled with the various systems of the mobile computing device 1500 for communication with and control thereof. For example, the processor 1502 may be coupled to a touch screen controller 1504, radio communication elements, speakers and microphones, and an internal memory 1506. The processor 1502 may be one or more multi-core integrated circuits designated for general or specific processing tasks. The internal memory 1506 may be volatile or non-volatile memory, and may also be secure and/or encrypted memory, or unsecure and/or unencrypted memory, or any combination thereof. In another embodiment (not shown), the mobile computing device 1500 may also be coupled to an external memory, such as an external hard drive.

The touch screen controller 1504 and the processor 1502 may also be coupled to a touch screen panel 1512, such as a resistive-sensing touch screen, capacitive-sensing touch screen, infrared sensing touch screen, etc. Additionally, the display of the mobile computing device 1500 need not have touch screen capability. The mobile computing device 1500 may have one or more radio signal transceivers 1508 (e.g., Peanut, Bluetooth, Bluetooth LE, ZigBee, Wi-Fi®, radio frequency (RF) radio, etc.) and antennae, the mobile computing device antenna 1510, for sending and receiving communications, coupled to each other and/or to the processor 1502. The radio signal transceivers 1508 and the mobile computing device antenna 1510 may be used with the above-mentioned circuitry to implement the various wireless transmission protocol stacks and interfaces. The mobile computing device 1500 may include a cellular network wireless modem chip 1516 coupled to the processor that enables communication via a cellular network.

The mobile computing device 1500 may include a peripheral device connection interface 1518 coupled to the processor 1502. The peripheral device connection interface 1518 may be singularly configured to accept one type of connection, or may be configured to accept various types of physical and communication connections, common or proprietary, such as USB, FireWire, Thunderbolt, or PCIe. The peripheral device connection interface 1518 may also be coupled to a similarly configured peripheral device connection port (not shown).

In various embodiments, the mobile computing device 1500 may include microphones 1515. For example, the mobile computing device may have a microphone 1515 for receiving voice or other audio frequency energy from a user during a call.

The mobile computing device 1500 may also include speakers 1514 for providing audio outputs. The mobile computing device 1500 may also include a housing 1520, constructed of a plastic, metal, or a combination of materials, for containing all or some of the components discussed herein. The mobile computing device 1500 may include a power source 1522 coupled to the processor 1502, such as a disposable or rechargeable battery. The rechargeable battery may also be coupled to the peripheral device connection port to receive a charging current from a source external to the mobile computing device 1500. The mobile computing device 1500 may also include a physical button 1524 for receiving user inputs. The mobile computing device 1500 may also include a power button 1526 for turning the mobile computing device 1500 on and off.

In some embodiments, the mobile computing device 1500 may further include an accelerometer 1528, which senses movement, vibration, and other aspects of the device through the ability to detect multi-directional values of and changes in acceleration. In the various embodiments, the accelerometer 1528 may be used to determine the x, y, and z positions of the mobile computing device 1500. Using the information from the accelerometer, a pointing direction of the mobile computing device 1500 may be detected.

Figure 16:
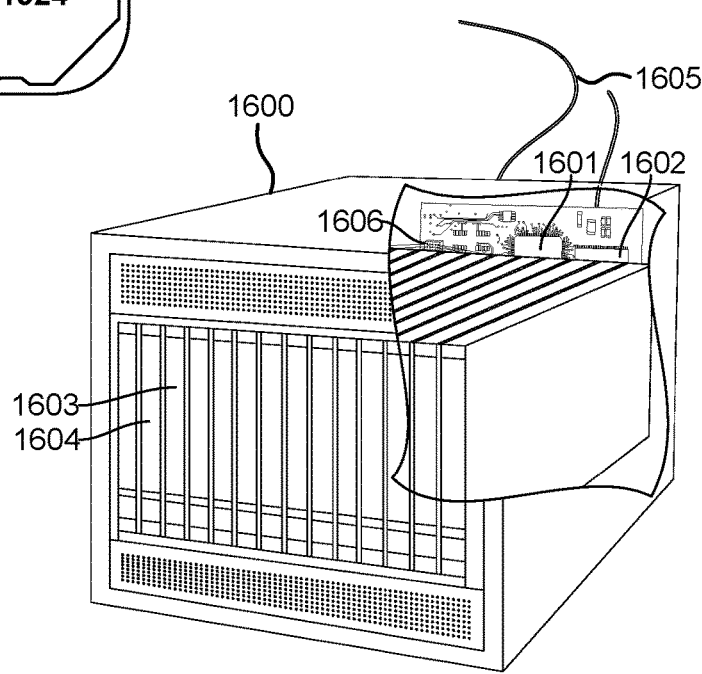
FIG. 16 is a component diagram of another remote computing device in the form of a server, suitable for use with the various embodiments.

Various forms of computing devices may be used to communicate with a processor of a robotic vehicle, such as the aerial robotic vehicle (e.g., 100), including personal computers, mobile computing devices (e.g., smartphones, etc.), servers, laptop computers, etc., to implement the various embodiments including the embodiments described with reference to FIGS. 1-16. Such computing devices may typically include, at least, the components illustrated in FIG. 16, which illustrates an example server computing device. With reference to FIGS. 1-16, the server 1600 may typically include a processor 1601 coupled to volatile memory 1602 and large capacity nonvolatile memory 1603, 1604, such as a disk drive. The server 1600 may also include one or more disc-drives (e.g., compact disc (CD) or digital versatile disc (DVD)) coupled to the processor 1601. The server 1600 may also include network access ports 1605 (or interfaces) coupled to the processor 1601 for establishing data connections with a network, such as the Internet and/or a local area network coupled to other system computers and servers.

Similarly, the server 1600 may include additional access ports 1606, such as USB, Firewire, Thunderbolt, and the like for coupling to peripherals, external memory, or other devices.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method of transporting a payload using a robotic vehicle, comprising:
   determining, by a processor of the robotic vehicle, whether the payload is securely held by the robotic vehicle during navigation of the robotic vehicle according to a current navigation plan;
   taking, by the processor, a corrective action, during the navigation of the robotic vehicle, in response to determining that the payload is not securely held by the robotic vehicle; and
   continuing, by the processor, with the current navigation plan in response to determining that the payload is securely held by the robotic vehicle.

2. The method of claim 1, wherein determining whether the payload is securely held by the robotic vehicle is based on an indication received from a sensor configured to detect changes in where the payload is held by the robotic vehicle.

3. The method of claim 1, wherein determining whether the payload is securely held by the robotic vehicle is based on an indication received from a sensor onboard the robotic vehicle.

4. The method of claim 1, wherein determining whether the payload is securely held by the robotic vehicle is based on an indication received from an onboard motor of the robotic vehicle in the form of a change in motor load.

5. The method of claim 1, wherein determining whether the payload is securely held by the robotic vehicle is based on an indication received from an onboard motor of the robotic vehicle in the form of a change in lift profile of the robotic vehicle.

6. The method of claim 1, wherein taking the corrective action in response to determining that the payload is not securely held by the robotic vehicle includes the processor changing a force applied to the payload by at least one of a payload securing mechanism.

7. The method of claim 1, wherein taking the corrective action in response to determining that the payload is not securely held by the robotic vehicle includes adjusting the current navigation plan.

8. The method of claim 7, wherein adjusting the current navigation plan includes changing a route to a destination.

9. The method of claim 7, wherein the current navigation plan controls at least one navigation characteristic selected from a group including slowing-down, reducing maneuverability, reducing top speed, limiting acceleration, reducing altitude, avoiding dangerous recovery zones, avoiding impractical recovery zones, avoiding a route through or over an occupied area, and avoiding one or more properties.

10. The method of claim 1, wherein taking the corrective action in response to determining that the payload is not securely held by the robotic vehicle includes activating at least one sensor not currently monitoring payload.

11. The method of claim 1, wherein taking the corrective action in response to determining that the payload is not securely held by the robotic vehicle includes transmitting a message indicating that the payload is loose.

12. The method of claim 1, wherein taking the corrective action in response to determining that the payload is not securely held by the robotic vehicle includes transmitting via an onboard transmitter a request for assistance.

13. The method of claim 1, wherein taking the corrective action in response to determining that the payload is not securely held by the robotic vehicle comprises:
determining a parking location for the robotic vehicle; and
controlling, by the processor, the robotic vehicle to park at the determined parking location.

14. The method of claim 1, wherein the robotic vehicle is an aerial robotic vehicle.

15. A robotic vehicle, comprising:
a payload securing mechanism; and
a processor coupled to the payload securing mechanism and configured with processor-executable instructions to:
determine whether a payload is securely held by the robotic vehicle during navigation of the robotic vehicle according to a current navigation plan;
take a corrective action, during the navigation of the robotic vehicle, in response to determining that the payload is not securely held by the robotic vehicle; and
continue with the current navigation plan in response to determining that the payload is securely held by the robotic vehicle.

16. The robotic vehicle of claim 15, wherein the processor is further configured with processor-executable instructions to determine whether the payload is securely held by the robotic vehicle based on an indication received from a sensor configured to detect changes in where the payload is held by the robotic vehicle.

17. The robotic vehicle of claim 15, wherein the processor is further configured with processor-executable instructions to determine whether the payload is securely held by the robotic vehicle based on an indication received from a sensor onboard the robotic vehicle.

18. The robotic vehicle of claim 15, wherein the processor is further configured with processor-executable instructions to determine whether the payload is securely held by the robotic vehicle based on an indication received from an onboard motor of the robotic vehicle in the form of a change in motor load.

19. The robotic vehicle of claim 15, wherein the processor is further configured with processor-executable instructions to determine whether the payload is securely held by the robotic vehicle based on an indication received from an onboard motor of the robotic vehicle in the form of a change in lift profile of the robotic vehicle.

20. The robotic vehicle of claim 15, wherein the processor is further configured with processor-executable instructions to take a corrective action, in response to determining that the payload is not securely held by the robotic vehicle, that includes the processor changing a force applied to the payload by at least one of a payload securing mechanism.

21. The robotic vehicle of claim 15, wherein the processor is further configured with processor-executable instructions to take a corrective action, in response to determining that the payload is not securely held by the robotic vehicle, that includes adjusting the current navigation plan.

22. The robotic vehicle of claim 21, wherein the processor is further configured with processor-executable instructions such that the current navigation plan controls at least one navigation characteristic selected from a group including slowing-down, reducing maneuverability, reducing top speed, limiting acceleration, reducing altitude, avoiding dangerous recovery zones, avoiding impractical recovery zones, avoiding a route through or over an occupied area, and avoiding one or more properties.

23. The robotic vehicle of claim 15, wherein the processor is further configured with processor-executable instructions to take a corrective action, in response to determining that the payload is not securely held by the robotic vehicle, that includes activating at least one sensor not currently monitoring payload.

24. The robotic vehicle of claim 15, wherein the processor is further configured with processor-executable instructions to take a corrective action, in response to determining that the payload is not securely held by the robotic vehicle, that includes transmitting a message indicating that the payload is loose.

25. The robotic vehicle of claim 15, wherein the processor is further configured with processor-executable instructions to take a corrective action, in response to determining that the payload is not securely held by the robotic vehicle, that includes transmitting via an onboard transmitter a request for assistance.

26. The robotic vehicle of claim 15, wherein the processor is further configured with processor-executable instructions to take a corrective action, in response to determining that the payload is not securely held by the robotic vehicle, that comprises:
determining a parking location for the robotic vehicle; and
controlling the robotic vehicle to park at the determined parking location.

27. The robotic vehicle of claim 15, wherein the robotic vehicle is an aerial robotic vehicle.

28. A robotic vehicle, comprising:
means for determining whether a payload is securely held by the robotic vehicle during navigation of the robotic vehicle according to a current navigation plan;
means for taking a corrective action, during the navigation of the robotic vehicle, in response to determining that the payload is not securely held by the robotic vehicle; and
means for continuing with the current navigation plan in response to determining that the payload is securely held by the robotic vehicle.

29. A processing device configured for use in a robotic vehicle and configured to:
determine whether a payload is securely held by the robotic vehicle during navigation of the robotic vehicle according to a current navigation plan;
take a corrective action, during the navigation of the robotic vehicle, in response to determining that the payload is not securely held by the robotic vehicle; and continue with the current navigation plan in response to determining that the payload is securely held by the robotic vehicle.

30. The processing device of claim 29, wherein the processing device is further configured to take a corrective action, in response to determining that the payload is not securely held by the robotic vehicle, comprising at least one of:
   adjusting the current navigation plan;
   activating at least one sensor not currently monitoring payload;
   transmitting a message indicating the payload is loose;
   transmitting via an onboard transmitter a request for assistance; and
   determining a parking location for the robotic vehicle and controlling the robotic vehicle to park at the determined parking location.

* * * * *